(12) United States Patent
Dahan et al.

(10) Patent No.: US 10,154,098 B2
(45) Date of Patent: Dec. 11, 2018

(54) TRANSACTIONAL BOUNDARIES FOR SOFTWARE SYSTEM PROFILING

(71) Applicant: CA, Inc., Islandia, NY (US)

(72) Inventors: Jean David Dahan, Cedar Park, TX (US); Arpad Jakab, Oakland, CA (US)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 14/990,173

(22) Filed: Jan. 7, 2016

(65) Prior Publication Data

US 2017/0199736 A1  Jul. 13, 2017

(51) Int. Cl.
  *G06F 9/44* (2018.01)
  *H04L 29/08* (2006.01)
  *G06F 8/20* (2018.01)

(52) U.S. Cl.
  CPC .............. *H04L 67/142* (2013.01); *G06F 8/20* (2013.01); *H04L 67/22* (2013.01); *H04L 67/306* (2013.01); *H04L 67/34* (2013.01)

(58) Field of Classification Search
  None
  See application file for complete search history.

(56) References Cited

U.S. PATENT DOCUMENTS

| | | |
|---|---|---|
| 5,345,587 A | 9/1994 | Fehskens et al. |
| 5,450,586 A | 9/1995 | Kuzara et al. |
| 5,576,965 A | 11/1996 | Akasaka et al. |
| 6,122,627 A | 9/2000 | Carey et al. |
| 6,134,540 A | 10/2000 | Carey et al. |
| 6,810,368 B1 | 10/2004 | Pednault |
| 6,879,946 B2 | 4/2005 | Rong et al. |
| 6,883,162 B2 | 4/2005 | Jackson et al. |
| 6,957,199 B1 | 10/2005 | Fisher |
| 7,376,549 B2 | 5/2008 | Horikawa |
| 7,437,710 B2 | 10/2008 | Bau et al. |
| 7,487,508 B2 | 2/2009 | Fu et al. |
| 7,539,980 B1 | 5/2009 | Bailey et al. |
| 7,552,036 B2 | 6/2009 | Oslake et al. |
| 7,555,418 B1 | 6/2009 | Qadeer et al. |
| 7,676,538 B2 | 3/2010 | Potter et al. |

(Continued)

OTHER PUBLICATIONS

Wikipedia, "Mock Object," Sep. 23, 2008, printed May 31, 2009, http://en.wikipedia.org/wiki/Mock_object, pp. 1-5.

(Continued)

*Primary Examiner* — Qamrun Nahar
(74) *Attorney, Agent, or Firm* — Alliance IP, LLC

(57) ABSTRACT

Transaction data is received from a software-based agent instrumented on a particular software component in a system comprising a plurality of software components. The transaction data can describe characteristics of a particular transaction involving the particular software component and another software component in the plurality of software components as observed by the agent during operation of the system, the particular transaction is contemporaneous with another transaction involving software components in the system. From the transaction data, the particular transaction is determined to fall within a defined transaction boundary for the system. A profiler is automatically invoked to profile the particular transaction based on determining that the particular transaction falls within the transaction boundary.

22 Claims, 15 Drawing Sheets

(56) References Cited

U.S. PATENT DOCUMENTS

| | | |
|---|---|---|
| 7,783,613 B2 | 8/2010 | Gupta et al. |
| 7,805,496 B2 | 9/2010 | Aiber et al. |
| 7,873,594 B2 | 1/2011 | Harada et al. |
| 7,945,900 B2 | 5/2011 | Hsieh |
| 7,966,183 B1 | 6/2011 | Kryskow et al. |
| 8,060,864 B1 | 11/2011 | Michelsen |
| 8,112,262 B1 | 2/2012 | Michelsen |
| 8,538,740 B2 | 9/2013 | Kumar et al. |
| 8,898,681 B1 | 11/2014 | Acheff et al. |
| 8,935,573 B2 | 1/2015 | Horsman et al. |
| 9,201,767 B1 | 12/2015 | Tarlton et al. |
| 9,323,645 B2 | 4/2016 | Michelsen |
| 9,531,609 B2 | 12/2016 | Talbot et al. |
| 2002/0010781 A1 | 1/2002 | Tuatini |
| 2003/0055670 A1 | 3/2003 | Kryskow et al. |
| 2003/0217162 A1 | 11/2003 | Fu et al. |
| 2004/0078782 A1 | 4/2004 | Clement et al. |
| 2004/0128259 A1 | 7/2004 | Blakeley et al. |
| 2004/0162778 A1 | 8/2004 | Kramer et al. |
| 2004/0230674 A1 | 11/2004 | Pourheidari et al. |
| 2004/0243334 A1 | 12/2004 | Wrigley et al. |
| 2004/0243338 A1 | 12/2004 | Sabiers et al. |
| 2005/0027648 A1 | 2/2005 | Knowles et al. |
| 2005/0063335 A1 | 3/2005 | Shenfield et al. |
| 2005/0198401 A1 | 9/2005 | Chron et al. |
| 2005/0289231 A1 | 12/2005 | Harada et al. |
| 2006/0129988 A1 | 6/2006 | Calsyn et al. |
| 2006/0224375 A1 | 10/2006 | Barnett et al. |
| 2006/0235675 A1 | 10/2006 | Oslake et al. |
| 2007/0006177 A1 | 1/2007 | Aiber et al. |
| 2007/0033442 A1 | 2/2007 | Tillmann et al. |
| 2007/0073682 A1 | 3/2007 | Adar et al. |
| 2007/0169003 A1 | 7/2007 | Branda et al. |
| 2007/0261035 A1 | 11/2007 | Duneau |
| 2007/0277158 A1 | 11/2007 | Li et al. |
| 2008/0010074 A1 | 1/2008 | Brunswig et al. |
| 2008/0120129 A1 | 5/2008 | Seubert et al. |
| 2008/0127093 A1 | 5/2008 | Fernandez-lvern et al. |
| 2008/0262797 A1* | 10/2008 | Carusi ............... G06F 11/3419 |
| | | 702/186 |
| 2009/0064149 A1 | 3/2009 | Singh et al. |
| 2009/0089783 A1 | 4/2009 | Wang et al. |
| 2009/0094684 A1 | 4/2009 | Chinnusamy et al. |
| 2009/0119301 A1 | 5/2009 | Cherkasova et al. |
| 2009/0187534 A1 | 7/2009 | Broll et al. |
| 2009/0204669 A1 | 8/2009 | Allan |
| 2009/0234710 A1 | 9/2009 | Hassine et al. |
| 2009/0282403 A1 | 11/2009 | Poole et al. |
| 2009/0298458 A1 | 12/2009 | Bakker et al. |
| 2010/0037100 A1 | 2/2010 | Lopian |
| 2010/0145962 A1 | 6/2010 | Chen et al. |
| 2010/0169867 A1 | 7/2010 | Wegmann |
| 2010/0318974 A1 | 12/2010 | Hrastnik et al. |
| 2012/0059868 A1 | 3/2012 | Buckl et al. |
| 2012/0084754 A1 | 4/2012 | Ziegler et al. |
| 2014/0108589 A1 | 4/2014 | Dhanda |
| 2014/0223418 A1 | 8/2014 | Michelsen et al. |
| 2014/0337091 A1* | 11/2014 | Fort ............... G06Q 30/0201 |
| | | 705/7.29 |
| 2015/0205699 A1 | 7/2015 | Michelsen |
| 2015/0205700 A1 | 7/2015 | Michelsen |
| 2015/0205701 A1 | 7/2015 | Michelsen |
| 2015/0205702 A1 | 7/2015 | Michelsen |
| 2015/0205703 A1 | 7/2015 | Michelsen |
| 2015/0205708 A1 | 7/2015 | Michelsen |
| 2015/0205712 A1 | 7/2015 | Michelsen |
| 2015/0205713 A1 | 7/2015 | Michelsen |
| 2015/0286470 A1 | 10/2015 | Dahan et al. |
| 2016/0125052 A1 | 5/2016 | Dahan et al. |
| 2016/0239409 A1 | 8/2016 | de Oliveira Staudt et al. |
| 2017/0199806 A1 | 7/2017 | Dahan et al. |

OTHER PUBLICATIONS

Lisa, 2.0 User's Guide, Interactive TKO, Feb. 27, 2003, pp. 1-130.

Lisa, 2.0 Developer's Guide, Interactive TKO, Mar. 13, 2003, pp. 1-23.

Chapter 5—Service Discovery, Bluetooth Application Developer's Guide, 2002 (pp. 167-209).

Chatterjee, S., "Messaging Patterns in Service-Oriented Architecture, Part 1," msdn.microsoft.com/en-us/library/aa480027.aspx, Apr. 2004, (pp. 1-21).

Time to live—Wikipedia, the free encyclopedia; 2015; pp. 1-3. http://en.wikipedia.org/wikiiTime_to_live>, examiner annotated document.

Web Discussion: "Is TCP protocol stateless or not?" available online at "http://stackoverflow.com/questions/19899236/is-tcp-protocol-statelessor-not" pp. 1-3 (2013).

U.S. Appl. No. 14/990,630.
U.S. Appl. No. 12/242,783.
U.S. Appl. No. 13/341,650.
U.S. Appl. No. 14/626,867.
U.S. Appl. No. 14/626,872.
U.S. Appl. No. 14/626,878.
U.S. Appl. No. 14/626,880.
U.S. Appl. No. 14/626,886.
U.S. Appl. No. 14/626,890.
U.S. Appl. No. 14/626,894.

* cited by examiner

TRANSACTIONAL BOUNDARIES FOR SOFTWARE SYSTEM PROFILING

BACKGROUND

The present disclosure relates in general to the field of computer software development tools, and more specifically, to facilitating a shared software development environment.

Software development can involve a variety of tools to support a development life cycle of an application or system. The development cycle can include activities such as system design, development, integration and testing, deployment, maintenance, and evaluation. As software systems become more complex, such as in service-oriented architectures linking multiple traditional systems (from potentially multiple different software vendors) other development cycles and strategies are emerging, including waterfall, spiral, Agile development, rapid prototyping, incremental, and synchronize and stabilize. In the case of Agile methodologies, the focus can be on lightweight processes which allow for rapid and iterative changes within the development cycle. Further complicating the tasks and management of development activities within modern software development is the reality that multiple developers often collaborate to build and perform development tasks involving a single system. Traditional development tools, such as debuggers, profilers, loggers, etc. can be ill-equipped to handle the evolving landscape of software development, particularly within shared development environments.

BRIEF SUMMARY

According to one aspect of the present disclosure, transaction data is received from a software-based agent instrumented on a particular software component in a system comprising a plurality of software components. The transaction data can describe characteristics of a particular transaction involving the particular software component and another software component in the plurality of software components as observed by the agent during operation of the system, the particular transaction is contemporaneous with another transaction involving software components in the system. A system can determine, from the transaction data, that the particular transaction falls within a defined transaction boundary for the system, where transactions meeting a set of conditions fall within the transaction boundary, and the other transaction falls outside the transaction boundary. A profiler can then be invoked to profile the particular transaction based on determining that the particular transaction falls within the transaction boundary.

BRIEF DESCRIPTION OF THE DRAWINGS

Like reference numbers and designations in the various drawings indicate like elements.

DETAILED DESCRIPTION

Figure 1:
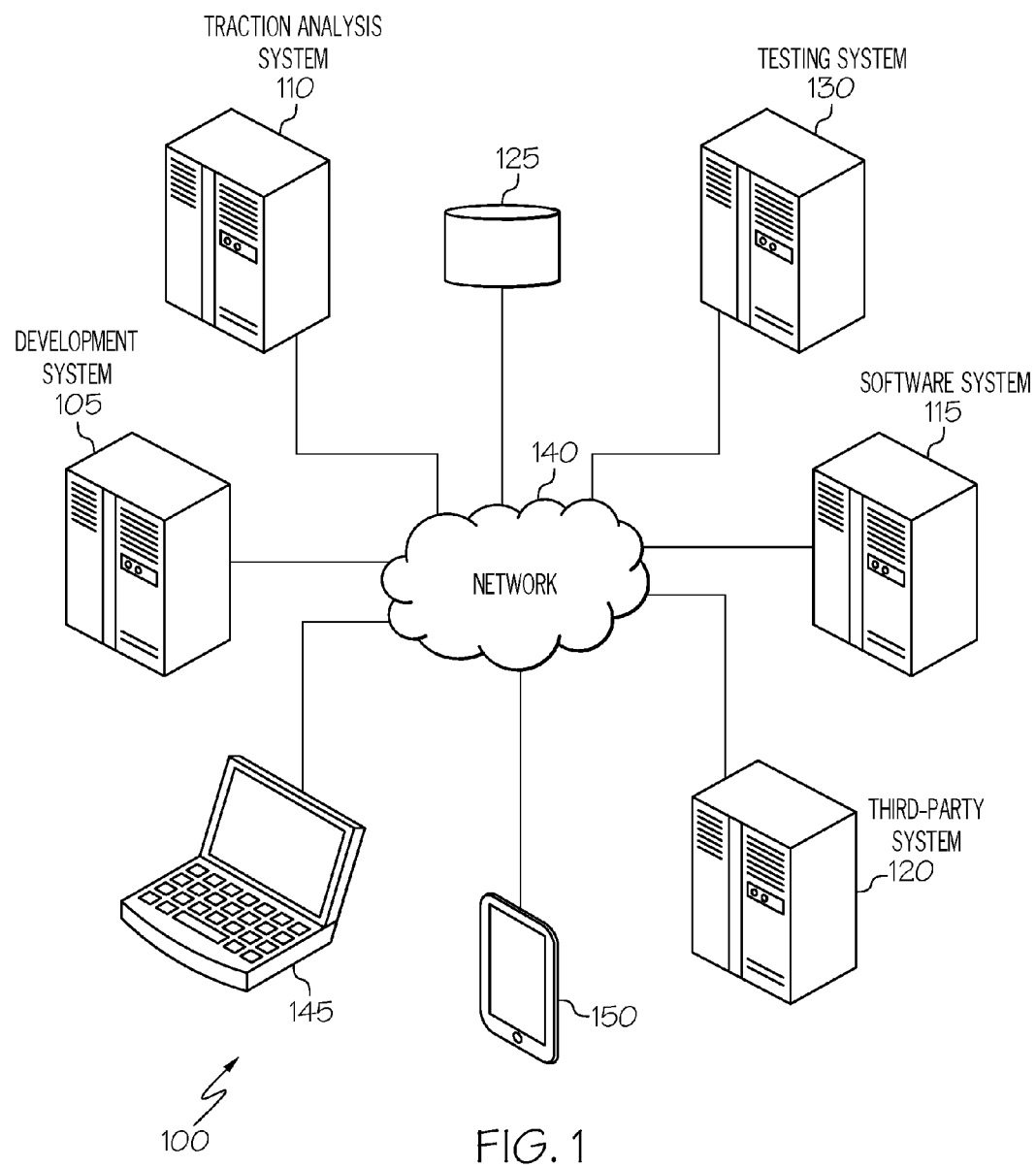
FIG. 1 is a simplified schematic diagram of an example computing system including an example development system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a simplified block diagram is shown illustrating an example computing system 100 including a shared software development system 105 and a transaction analysis system 110, among other hardware and software computing systems. In some implementations, functionality of the development system 105, transaction analysis service system 110, and other systems and tools can be combined or even further divided and implemented among multiple different systems. The shared software development system 105 can be provided with tools for use in the development cycle of a software program, such as a program, or application, hosted on one or more software systems (e.g., 115, 120, 125). Development tools can be provided or supported by the development system 105 such as a profiler tool, a logging tool, a debugger, a source control tool for managing proposed software patches and updates, a software virtualization system, among other examples.

The transaction analysis system 110 can include functionality for enhancing use of the development tools provided by development system 105. For instance, the transaction analysis system 110 can detect conditions or transaction boundaries involving software transactions that may span multiple different systems in a tiered software system. For instance, satisfaction of a condition can be detected upstream from a particular component of the software system, but can be used to selectively trigger performance of a development activity on the particular component, even when the condition would otherwise be impossible to detect from monitoring only the particular component, among other examples. More generally, where certain development activities might traditionally affect multiple portions of a software system (and multiple different developers working on the same software system), the transaction analysis system can enable more precise application of the development tools of development system 105. The transaction analysis system 110 can detect transaction or session boundaries in which a particular development activity is to be performed based on transaction data collected from software-based agents deployed throughout a multi-component software system. This transaction data can be further utilized to observe how software transactions proceed, or flow, through the system.

At least some of software systems (e.g., 115, 120) can host software that is the subject of development activities performed using tools of development system 105. This software can be an application, program, or portion (collectively referred to herein as "component") of a larger, multi-tiered software system. Software components can utilize, consume data and services of, provide data or services to, or otherwise be at least partially dependent on or function in association with one or more other software components hosted on the same (e.g., 115) or a different software server system (e.g., 120, 125). Software components in the system can be hosted on systems (e.g., 115, 120) of a single entity or may be distributed on systems (e.g., 125) controlled by one or more third parties, among other examples. Further, software components in some software systems can interact with and consume data from and/or contribute data to one or more data services or data stores, such as database 130, among other examples. Development activities can potentially be utilized during the development cycles of any one of the various software components in a broader software system and may target only specific functionality or transaction capabilities of the components and the system as a whole.

One or more computing systems and services can be hosted on machines communicatively coupled by one or more networks (e.g., 140), including local networks, public networks, wide area networks, broadband cellular networks, the Internet, and the like. Systems with which a system under development (e.g., 115) can interact can include data stores (e.g., 130), other software systems (e.g., 120, 125), and constituent software components accessible over the one or more networks 140. Further, systems and services (e.g., 105, 110, etc.) provided to support development of the one or more of systems (e.g., hosted on 115, 120, 125, 130, etc.) can also be provided local to or remote from (e.g., over network 140) the target systems (e.g., 115, 120, 125, 130), among other examples. Additionally, computing environment 100 can include one or more user devices (e.g., 145, 150) that can allow users to interact with one or more of the servers, services, data structures, and services (e.g., 105, 110, 115, 120, 125, 130, etc.) provided in the environment. Such user interactions can take place locally at the host systems of such software components or remotely over network 140, using user devices (e.g., 145, 150).

In general, "servers," "clients," "computing devices," "network elements," "hosts," "system-type system entities," "user devices," and "systems" (e.g., 105, 110, 115, 120, 125, 130, 145, 150, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 125, 130, 145, 150, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a shared development system 105, transaction analysis system 110, server system (e.g., 115) or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Modern software development can involve the participation of multiple development team members working substantially concurrently to build, test, deploy, and assess the system. Development activities within a shared software system can be complicated by the multiple developers attempting to access and utilize the same portions of the system to perform development tasks falling under each developer's responsibilities within the team. Further, traditional development tools used to analyze and test systems during development may lack the precision to selectively perform development activities on only a portion of the system (and its transactions) without interfering with the activities of other users (or even customers, in the case of a production system).

As an example, profiling can be utilized to investigate a program's (e.g., a given software component of a larger system) behavior by gathering particular information as the program executes. Profiling typically involves the gathering of specific types of information, such as identifying which functions are called, the frequency and duration of such function calls, and any events occurring during operation of the program. The output of the profiler can include a statistical summary of the observed events or trace of the events. Profiling, in one implementation, can involve a profiler tool sampling a system to periodically (e.g., every few milliseconds) capturing views, or a snapshot, of all of the threads within a particular system or portion of a system (including the corresponding method calls and stacks). A series of such snapshots can be merged into the statistical view generated by the profiler as an output. Profilers do not have access to the actual data being passed between components of a system (e.g., requests, responses, arguments, return values, etc.) and typically are implemented as low overhead tools.

In a system in which multiple transactions may be executing at once, profiling may indiscriminately profile all transactions that occur involving a particular software component (and the execution of its code) during the profiling. This may jeopardize the goals of the profiling, such as when a user launches a test transaction using a particular software component in connection with a profiling session, only to have the profile results document not only the transaction of interest but also all other contemporaneous transactions that utilized the particular software component. In such a case, the developer user may be forced to reserve use of a shared system resource (e.g., one or more particular software components) so as to perform targeted profiling of the system. However, doing so would be disruptive to the remaining team, complicating or foreclosing their own development activities involving that portion of the system, among other example issues.

Figure 2:
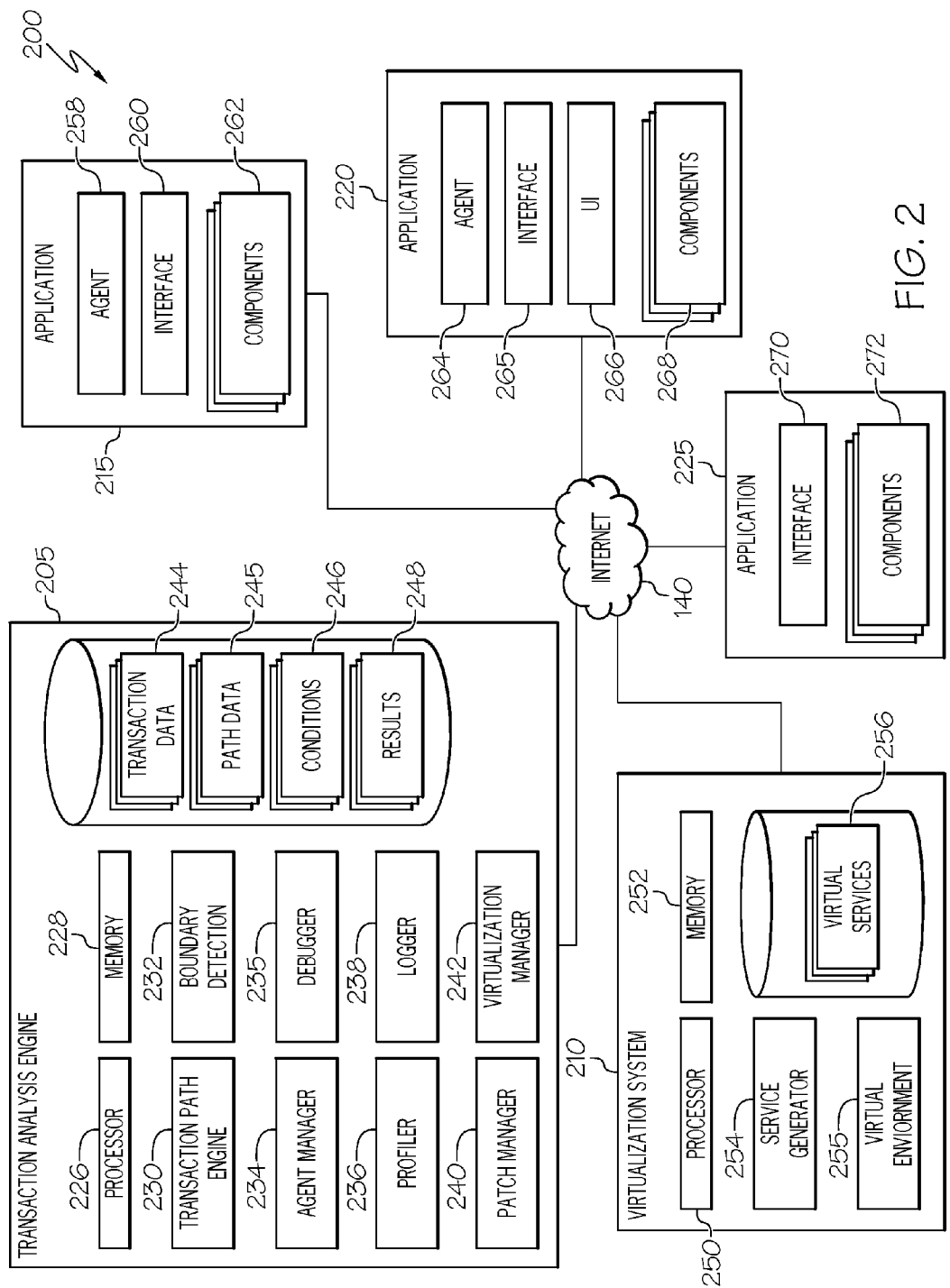
FIG. 2 is a simplified block diagram of an example computing system including an example shared development platform in accordance with at least one embodiment.

At least some of the systems described in the present disclosure, such as the systems of FIGS. 1 and 2, can include functionality that at least partially remedy or otherwise address at least some of the above-discussed examples deficiencies and issues, among others. For instance, a shared development platform can be provided that leverages intelligence garnered by a transaction analysis system that can be used to detect boundaries between the various transactions, processes, and threads running contemporaneously in a multi-component software system. A variety of different boundaries can be defined by users, each boundary indicating a respective set of one or more conditions that are to apply if a given transaction, transaction fragment, process, and/or thread is to "fall" within the boundaries. One or more development activities can be triggered to performed selectively on the specific transactions, processes, and threads that are determined to fall within a corresponding boundary (or "transaction boundary"). This can allow a single user (e.g., developer) to define logical boundaries in which a given development activity is to apply, without interfering with the development activities of other users who may be accessing or using the same software component(s) in connection with their own development activities. Thus, the shared development platform can enable logical, dedicated "sandboxes" in which an individual user (or subset of users) in a development team can perform various development activities, among other examples and potential benefits.

Turning to the example of FIG. 2, a simplified block diagram 200 is shown illustrating an example environment 200 including a shared development platform 205, a virtualization system 210, and one or more services, database management systems, programs, or applications (referred to in this example collectively as "applications" (e.g., 215, 220, 225). The systems 205, 210, 215, 220, 225, etc. can interact, for instance, over one or more networks 140. In one example implementation, a development platform 205 can include one or more processor devices (e.g., 226) and one or more memory elements (e.g., 228) for use in executing one or more components, tools, or modules, or engines, such as a transaction path engine 230, boundary detection engine 232, agent manager 234, and one or more development tools. For instance, in the example of FIG. 2, the development platform 205 can provide a suite of development tools including examples such as a debugger 235, profiler 236, logger 238, patch manager 240, and virtualization 242, among other potential tools and components including combinations or further compartmentalization of the foregoing. In some implementations, development platform 205 can be implemented as multiple different distinct systems including, for example, varying combinations of the foregoing components and tools (e.g., 230, 232, 234, 235, 236, 238, etc.) and accompanying data (e.g., 244, 245, 246, 248).

In one example, test system 205 can include a transaction path engine 230 configured to inspect a particular application (e.g., 215, 220, 225) or combination of co-functioning applications (e.g., 215 and 220) to identify one or more transactions involving the application(s) as well as the respective software components (e.g., 262, 268, 272) of the applications (e.g., 215, 220, 225) invoked and utilized within a broader software system and software transactions. Information gathered from monitoring or inspection of the transaction can be stored in transaction data 244. Further, the flow path of the transactions can additionally be identified and flow path data 245 can be generated describing the flow between software components (e.g., 262, 268, 272) and the respective contributions, operations, processes, or transaction fragments of the applications within the flow.

In some implementations, transaction path engine 230 can operate cooperatively with an agent manager 234 interfacing with or otherwise managing one or more instrumentation agents (or "agents") (e.g., 258, 264) deployed on one or more applications (e.g., 215, 220) for use in aiding the monitoring of performance of various components (e.g., 256, 264) of the applications. In some cases, a single agent (e.g., 258) can monitor operation of and transactions involving more than one software component and in other cases each software component (e.g., 268) can be instrumented with a respective agents (e.g., 264). Agents (e.g., 258, 264), in either implementation, can be software-implemented agents that are configured to provide visibility into the internal operations of each instrumented component (e.g., 256, 264, etc.) as well as the data being communicated into and out of each component. Each agent can be configured, for example, to detect requests and responses being sent to and from the component or application in which that agent is embedded. Each agent (e.g., 258, 264) can be configured to generate information about the detected requests and/or responses and to report that information to other services and tools, such as agent manager 236, virtualization system 210, transaction path engine 230, and one or more development tools (e.g., 235, 236, 268, 240, 242, etc.). Additionally, each agent can be configured to detect and report on activity that occurs internal to the component in which the instrumentation agent is embedded. Collectively, such information can be embodied as transaction data generated by the agents (e.g., 258, 264) to report characteristics of the components' operation and transaction observed by the respective agent. Transaction data from an agent can be marked to identify the agent from which it originates.

In response to detecting a request, response, and/or other activity of a transaction to be monitored, each agent (e.g., 258, 264) can be configured to detect one or more characteristics associated with that activity and/or the monitoring of that activity by the agent. The characteristics can include a frame identifier, which identifies a message, with respect to the agent, sent by the agent to a managing service, such as agent manager 236, embodying at least a portion of the transaction data sent from the agent to report the characteristics observed by the agent. For instance, frames can include a parent identifier, which identifies the requester software component that generated the request sent to the component or sub-component monitored by the instrumentation agent; a transaction identifier, identifying the transaction, with respect to the component or sub-component being monitored, such as transactions between components carried out through communications and calls made over one or more network connections; a session identifier (or token) to propagate session information detected in one portion of the transaction throughout the transaction; and an agent identifier that identifies the agent, with respect to the other instrumentation agents in the testing system, that is generating the characteristics, among other characteristics. Such characteristics can include other information such as a system clock value, current processor and/or memory usage, contents of the request, contents of the response to the request, identity of the requester that generated the request, identity of the responder generating the response to the request, Java virtual machine (JVM) statistics, standard query language (SQL) queries (SQLs), number of database rows returned in a response, logging information (e.g., messages logged in response to a request and/or response), error messages, simple object access protocol (SOAP) requests, values generated by the component that includes the instrumentation agent but that are not returned in the response to the request, web service invocations, method invocations (such as Enterprise Java Beans (EJB) method invocations), entity lifecycle events (such as EJB entity lifecycle events), heap sizing, identification of network connections involved in transactions, identification of messages and data exchanged between components, including the amount of such data, and the like. Characteristics can also include the thread name of a thread processing the request to generate the response and other data describing threads involved in a transaction, the class name of the class of an object invoked to process the request to generate the response, a Web Service signature used to contain the request and/or response, arguments provided as part of the request and/or response, an ordinal (e.g., relating to an order within a transaction), the duration of time spent processing the request and/or generating the response, state information, a local Internet Protocol (IP) address, a local port, a remote IP address, a remote port, and the like, among other examples.

As the above examples indicate, characteristic information can include information generated by the agent itself and information generated and/or processed by the component or sub-component monitored (and collected) by the agent (such as data sent or received by the component that intercepted by one or more agents). The agent can then cause information identifying those characteristics to be provided to one or more other services or tools (e.g., development tools 235, 236, 238, 240, 242, etc.) communicatively coupled to the agent or agent manager. In some embodiments, each instrumentation agent collects information to form a message, also referred to herein as a frame, which describes characteristics associated with either or both a detected request and a detected response to the request in a transaction. In some instances, an agent can return transaction data in a frame to describe both the request and its corresponding response as observed at a software component monitored by the agent. In such cases, the respective agent can wait for the response corresponding to the request to be generated and sent before sending the frame to another tool or engine (e.g., 234, 235, 236, 240, 242, etc.) making use of the information in the frame.

Additionally, agents can monitor and report characteristics independently for each transaction in which its respective monitored component(s) (e.g., 262, 268, etc.) participates. In some cases, an agent can send transaction data for each fragment of a transaction observed by the agent. For instance, separate frames can be sent for the request and corresponding response. An agent manager 234 can receive frames containing the transaction data and determine which requests and responses belong to which transaction fragments and transactions. Further, the transaction path engine 230 can utilize these relationships to stitch transaction fragment information collected from potentially multiple frames from multiple agents, to develop a chain of transaction fragments that map to the actual flow of the transaction as it traverses multiple software components of the system (and potentially multiple agent domains).

In some embodiments, all or some of agents (e.g., 258, 264) can be configured to perform interception and/or inspection (e.g., using the Java™ Virtual Machine Tool Interface, or JVM TI). Such an instrumentation agent can register with the appropriate application programming agent (API) associated with the component or process being monitored in order to be notified when entry and/or exit points occur. This allows the agent to detect requests and responses, as well as the characteristics of those requests and responses. In particular, this functionality can allow an agent to detect when a component begins reading and/or writing from and/or to a socket, to track how much data is accessed (e.g., read or written), obtain a copy of the data so read or written, and generate timing information (as well as information describing any other desired characteristics such as inbound/read or outbound/write identifiers) describing the time or order at which the data was read or written, among other information describing the data accessed, processed, or generated by the component.

In some instances, agents (e.g., 258, 264) can be configured to monitor individual threads by monitoring the storage used by each thread (i.e., the thread local storage for that thread), variable values utilized in the thread, functions called in the thread, among other information. Such agents can detect when the monitored thread begins reading or writing to a thread local variable in the thread local storage. In response to detecting this access to the thread local variable, the agent can track the amount (e.g., in bytes, as tracked by incrementing a counter) of data that has been accessed, as well as the starting offset within the thread local storage to which the access takes place. In response to detecting that the thread's access to the thread local variable has ended, the instrumentation agent can use the information about the access to identify characteristics such as the time of the access, the variable being accessed, the value being accessed, network calls being made, and the like. Agents can likewise identify and focus monitoring on specific processes and other quanta of software components and their execution (i.e., other than or in addition to threads).

As noted above, in some implementations, one of the characteristics that can be collected by agents (e.g., 258, 264) can include timing information, such as a timestamp, that indicates when a particular request was received or when a particular response was generated. Such timing information can be included in transaction data 244 and be used, for instance, by transaction path engine 230, to identify that frames, including frames received from different agents, are related to the same transaction. In some implementations, timers used by agents (e.g., 258, 264) can be synchronized to assist in correlating timing information collected between multiple agents. Additionally or alternatively, flow, organization, hierarchy, or timing of a particular transaction can be identified through the generation of transaction identifiers that include characteristics collected by agents (e.g., 258, 264) for use in identifying fragments of the transaction. Such transaction identifiers, or transaction fragment identifiers, can include data collected by instrumentation agents in connection with, for example, the exchange of data, messaging, and other communications between components in the transaction, from thread jumps identified within software processes involved in the transaction, and other features of the transaction or fragments of the transaction.

In some implementations, agents (e.g., 258, 264) can be implemented by inserting a few lines of code into the software component (or the application server associated with that software component) being instrumented. Such code can be inserted into a servlet filter, SOAP filter, a web service handler, an EJB3 method call, a call to a Java Database Connectivity (JDBC) handler, and the like. For example, an agent configured to monitor an EJB can be configured as an EJB3 entity listener (e.g., to monitor entity beans) or interceptor (e.g., to monitor session beans, etc.). Some components (or their corresponding application servers) may not provide users with the ability to modify their code, and thus some instrumentation agents can be implemented externally to the component being monitored in a manner that can cause all requests and responses being sent to and/or from that component to be handled by the corresponding agent(s). For example, for an existing database, an agent can be implemented as a driver. Calling components can be configured (e.g., by manipulating a driver manager) to call the instrumentation driver instead of the database's driver. The instrumentation driver can in turn call the database's driver and cause the database's driver to return responses to the instrumentation driver. For example, in one embodiment, the identity of the "real" driver for the database can be embedded in the uniform resource locator (URL) that is passed to the instrumentation driver. In this way, the instrumentation driver can intercept all calls to the database, detect characteristics of those calls, pass the calls to the appropriate database, detect characteristics of the corresponding responses, and then return the characteristics of those calls and responses within corresponding transaction data 240, among other examples.

In implementations utilizing one or more agent managers (e.g., 234), multiple agents (e.g., 258, 264) can communicate with single agent manager 234 via a messaging system. In some cases, agents monitoring components hosted on distinct, or remote, devices can communicate over one or more networks with one or more centralized, or semi-centralized, agent managers 234. In one example implementation, agents (e.g., 258, 264) can communicate with an agent manager 234 using a messaging system such as Java™ Message Service (JMS), among other examples. For instance, agent manager 234 can create a messaging system topic for each transaction (referred to herein as a transaction frame (TF) topic) and subscribe to that TF topic. The instrumentation agents, upon startup, can broadcast their existence to each other and/or to agent manager 234. The agents (e.g., 258, 264) can then get the TF topic from agent manager 234 and begin publishing messages onto a message bus on that TF topic. Agent manager 234 can monitor the published messages and determine whether those messages relate to the current TF topic. As needed, agent manager 236 creates new TF topics for new transactions. In other examples, agents (e.g., 258, 264) can alternatively communicate with agent manager 234 using techniques other than those involving messaging systems. For example, agents can write information to shared data repository (e.g., a database associated with the test system) using database commands, and an agent manager 234 can monitor those database commands to detect new information, among other examples.

As requests and responses progress through one or more systems (e.g., 215, 220, 225), additional characteristic information can be captured, for instance, as transaction data 244. For example, the operation of one or more software systems (e.g., 215, 220, 225) engaged in one or more transactions can be monitored, for instance, by one or more agents (e.g., 258, 264) and the agents can capture characteristic information associated with requests in the transaction (e.g., the time at which the request was received, the sender of that request, the time at which corresponding requests were sent to a database and/or other service, etc., how much data was exchanged, the identity of the communication channel used in the request or response, and the like) and the corresponding response, and generate transaction data 244 (e.g., frames) embodying the information. Agents, in some instances, can report transaction data to an agent manager 234 and additionally (or alternatively) store at least a portion of the transaction data at the agent.

As noted above, a transaction path engine 230 can determine and track the specific path, or flow, taken by a given transaction based on transaction data 244 captured and reported by agents observing the transaction at the participating software components. The path can be determined as the transaction progresses in substantially real time, with some transaction data being returned as some transaction fragments complete (but before others finish or begin). The transaction path engine 230 can access and utilize transaction information in transaction data 244 to identify fragments of a transaction and organize transaction fragments and accompanying information describing characteristics of the fragment of a particular transaction into groups corresponding to a common transaction. For instance, transaction fragment characteristics can be correlated to group corresponding frames into groups of frames that describe a complete transaction or session (that includes multiple transactions).

In some embodiments, in order to group frames, or otherwise identify relationships between frames or transaction fragments, transaction path engine 230 (or another tool) can sort the frames based upon particular characteristics, such as timing information associated with and/or included within those frames, the presence of a common session token included in the reported transaction data frames, parent and child component identifiers, the size of requests sent/received, among other information. After being sorted, the frames can be arranged in ascending or descending order, with respect to the timing or parent-child information, etc. For example, the frames can be sorted according to a timestamp indicating when each frame was generated, when one or more requests identified in each frame were generated or received, and/or when one or more responses identified in each frame were generated or received. In some embodiments, the frames can be sorted based upon multiple pieces of timing information.

In other examples, frames can be sorted, for example, based on an amount of data exchanged, the identity of a particular communication channel or network connection used, addresses of the receiving and sending components, the identification of the particular agents that provided the frames, etc. For instance, frames and accompanying transaction fragments can be correlated according to the amount and type of data that was received and/or generated, as detected by the agent, as well as information identifying the components or sub-components involved in the monitored activity. For example, such identity information can include information identifying the network ports (e.g., of the requester and responder), IP addresses, network information, or other features describing the communication of a request and corresponding response between a requester and responder. This information can be used to correlate or otherwise identify relationships between two different frames that have similar timing information and data amounts, for example. Identified network connections can be mapped to a particular portion, or fragment, of a transaction, and such fragments can be grouped (e.g., using the collected network connection description data) to identify particular transactions involving multiple different software components (and network connections), among other examples.

Within a group of frames or identified transaction fragments associated with the same transaction, transaction path engine 230 can order, or stitch, the frames to define a chain or order of transaction fragments within a given transaction or set of instances of a similar transaction. The stitching of the frames can be based on determined correlations between grouped frames (e.g., to identify parent-child relationships between given frames and their corresponding transaction fragments). The stitched frames can then define a transaction flow to allow the path, or flow, of the transaction to be followed from the start of the transaction to the end of the transaction and across a chain of potentially many different software components. Each frame can include a field that identifies that frame (e.g., a frame ID), as well as a field that identifies a parent frame (e.g., a parent frame ID). The value of each frame's parent frame ID can equal another frame's frame ID. These frame identifiers can be generated by the agents. In one embodiment, the frame identifiers can be generated from information identifying the IP address (or other addressing information) and port number used by the monitored component or sub-component, the amount of data sent or received by the monitored component during the monitored activity, and/or the instrumentation agent itself, among other information. Relationships can thereby be identified between parent frames, transaction fragments, and software components and corresponding child frames, transaction fragments, and components, to stitch these frames together, among other examples.

In addition to being able to use relationships or correlations to predict or determine a stitching or flow path of transaction fragments, transaction path engine 230, in some instances can use the lack of correlative data reported by an agent to determine that a given frame corresponds to a transaction fragment that represents a root or leaf (e.g., beginning or end) of a particular transaction or branch of a transaction. For instance, it can be identified that no related connections (or other transaction fragments) involving a particular software component (or just a single correlation) have been identified or reported and conclude, predictively, that the lack of further connections or other reporting data relating to the component or a flow including the component indicate that the transaction terminated at the component, among other examples. Similarly, root nodes can be predictively determined based on the absence of frames documenting an inbound connection at a particular component from which other transaction fragments (and related connections) originate, among other examples. Root nodes can be considered to represent the furthest "upstream" component in a flow, while leaf nodes represent the further "downstream" components in the flow.

A transaction path engine 230 can utilize and correlate transaction data 244 generated in part by one or more agents (e.g., 258, 264) to determine one or more transaction flow paths. The transaction path engine 230 can generate and maintain path data 245 describing the determined flow paths involving one or more software components (e.g., 256, 264, 266) or one or more software systems or applications (e.g., 215, 220, 225). Other tools, as well as other systems, can consume path data 245 to perform additional activities and services in support of tests and development of software systems (e.g., 215, 220, 225) described in the paths. For instance, graphical representations of the transaction paths can be generated from the path data to illustrate the involvement of a set of software components and how the transaction progressed through the set of software components. Additionally, the graphical representation can present representations of characteristics defined in the transaction information (e.g., characteristics of requests and responses in individual transaction fragments, characteristics of individual software components, etc.).

Transaction data (e.g., 244) can also be used to determine that one or more boundary conditions (e.g., 246) have been satisfied triggering targeted application of one or more development tools on transactions, fragments, and/or threads falling within the transaction boundary defined by the conditions (e.g., 246). As noted above, agents (e.g., 258, 264) can report at least some transaction data 244 in real time as it collected to identify that a transaction, transaction fragment, thread, or set of transactions or threads (including downstream threads and transaction fragments that have yet to begin and/or complete) fall within a transaction boundary. Boundary detection logic 232 can receive or otherwise access transaction data as it is reported by one or more agents (e.g., 258, 264) and can identify characteristics reported in the transactions that are included as conditions in one or more transaction boundary definitions (e.g., embodied in condition definition data 246). Boundary definitions (e.g., 246) can further identify one or more development tools (e.g., 235, 236, 238, 240, 242) that are to triggered when transactions (or portions of transactions) are determined to fall into one of the defined transaction boundaries. The boundary detection engine 232 can then interface with or otherwise control the invocation of these corresponding detection tools in response to detecting that transactions fall within one of the defined transaction boundaries.

A variety of different transaction boundaries can be defined for a single system. The system may include a number of different sub-systems, or tiers, and some of the boundaries may target development tasks to be performed on particular sub-systems or software components in the overall multi-tier software system. Some of the conditions may only be determinable based on the intensive view of the overall transaction(s) provided through a collection of agents instrumented throughout the software system. In some cases, determining that a condition applies to a particular transaction, transaction fragment, or thread may be dependent on another agent on another software component and/or server detecting the condition and the transaction path engine (or boundary detection) logic determining that an earlier (e.g., upstream) detected transaction characteristic triggers inclusion of various downstream transactions or transaction fragments within the transaction boundary. Indeed, in some cases, without the information provided by certain upstream agents, it may not be possible to determine that other downstream software transactions or threads are to fall within a transaction boundary and have corresponding development activities performed upon them.

As an example, a particular user may interface with a frontend system to send a request to the frontend system. The frontend system, in turn, may participate in transactions with various backend systems in connection with generating a response to the request. The backend systems, too, may transact with additional backend systems further downstream from the original request. In this example, a transaction boundary may be defined for a profiling activity (e.g., using profiler 236), such that all transactions (or transaction fragments) involving a session of the particular user are to be profiled. However, the frontend system may be the only system that receives data interpretable to identify that the transaction involves a session of the particular user. An agent at the frontend system can capture this information and cause a session token or identifier to be appended to data in downstream transactions in the session or to transaction data generated by agents monitoring the downstream software components. Accordingly, the transaction data received from the agents monitoring software components involved in transactions of the session can be used to identify downstream transactions and corresponding threads that are included in the session, triggering the selective profiling of each of these transactions as they take place (while other contemporaneous threads not identified as belonging to the particular user's session (and outside the relevant transaction boundary) are not profiled, among other examples.

Transaction boundaries can be defined for a variety of different development tools (e.g., 235, 236, 238, 240, 242) with differing conditions (e.g., 246) defined for triggering selective deployment of the tools on the various different software components in the system. Indeed, users can define transaction boundaries to enable the user to "carve out" that portion of the shared software system (under development) managed by the user-developer, such that the user's development activities do not interfere with other development activities of other users of the system (or even, in some cases, the production operation of the system).

In one example, development tools for which transaction boundaries can be defined may include a debugger 235, profiler 236, logger 238, patch manager 240, and virtualization manager 242, among potentially other development tools. A debugger can be used to debug code of the various software components included within the software system.

For instance, a debugger 236 may run based on breakpoints defined in the code. In one example, transaction boundaries can be defined as conditions for conditional invocation of specific breakpoints to be used in debugging of the system. A profiler 236 can perform software profiling on a software component, for instance, to identify the usage of particular instructions, the frequency and duration of various function calls, etc. during operation of the software components. In the case of profilers, example transaction boundaries can be defined to filter which threads of a software component or system are to be profiled during a profile session. Additionally, or alternatively, transaction boundaries may also be defined to cause a collection of diverse software components or transactions/transaction fragments to be selectively profiled during a profiling session, for instance, to generate profile results that describe operation of a chain of transactions in a session, a collection of instances of a particular type of transactions, etc. Similarly, a logger 238 can be utilized to log events that occur during execution of a software system and transaction boundaries can be similarly defined to selectively log only a particular portion of the transactions within a system of interest to an author of the transaction boundary, among other examples.

Continuing with the above example, development tools can assist developers in testing or observing the hypothetical implementation of certain changes to the code and/or functionality of various software component within the broader system. Applying such changes can be particular disruptive within a shared development project. A patch manager 240 can be used to selectively apply a patch (or code modification) to one or more software components in the system under development. A transaction boundary can be defined such that a patch to a particular software component is only applied selectively when the software component is involved in a transaction falling within the transaction boundary, among other examples. In other implementations, rather than selectively applying patches to a particular software component to test a hypothetical change to the particular software component, a virtualized instance of the particular software component can be provided that simulates the operation of the particular software component were it to have the change. Thus, the virtualized instance can be selectively invoked (e.g., in connection with a corresponding transaction boundary) to replace the actual software component in transactions within the transaction boundary to simulate the change, among other examples.

In development platforms (e.g., 205) including a virtualization development tool (e.g., 242), a supporting virtualization system (e.g., 210) may be provided separate from (or, alternatively, integrated with) the development platform 205. The virtualization system 210, in example, may include one or more processor devices 250, memory devices 252, and other hardware and software components including, for instance, a virtual service generator 254, virtual environment 255 for provisioning and executing virtual services, among other examples. A virtualization system 210 can be used to generate and manage virtual services (e.g., 256) that model software components and systems. Such virtual services 256 can be used as stand-ins (e.g., for particular software components) in tests and other development tasks involving the real-world systems modeled by the virtual service. Virtual services 256 can be generated by virtualization system 210 (e.g., using virtual service generator 248) based on detected requests and responses exchanged between two or more software components or systems. Such request and response information can be captured, for instance, by the same agents (e.g., 258, 264) in transaction data 244 and can be used to generate virtual services 256. Virtual services can capture and simulate the behavior, data and performance characteristics of complete composite application environments, making them available for development and testing at the request of a user or system and throughout the software lifecycle, among other advantages.

A virtualization system 210 can include functionality for the creation of complete software-based environments that simulate observed behaviors, stateful transactions and performance scenarios implemented by one or more software components or applications. Such virtual services provide functionality beyond traditional piecemeal responders or stubs, through logic permitting the recognition of input/requests and generation of outputs/responses that are stateful, aware of time, date, and latency characteristics, support such transaction features as sessions, SSL, authentication, and support string-based and dynamic request/response pairs, among other features. Service virtualization and other virtual models can be leveraged, for instance, when live systems are not available due to project scheduling or access concerns. In cases where components have not been built yet, environments can employ virtual services to rapidly model and simulate at least some of the software components to be tested within an environment. Virtual services can be invoked and executed in a virtual environment 255 implemented, for instance, within on-premise computing environments, in private and public cloud-based lab, using virtual machines, traditional operating systems, and other environments, among other examples. In some implementations, virtualization system 210 and virtual services 256 can utilize or adopt principled described, for example, in U.S. patent application Ser. No. 13/341,650 entitled "Service Modeling and Virtualization," incorporated herein by reference in its entirety as if completely and fully set forth herein.

As noted above, software systems and their constituent software components can include functionality for transacting with one or more other systems and components in a multi-tiered system. In some cases, software components can transact with other components over one or more networks (e.g., 140) (using corresponding network ports, sockets, etc.), APIs, or other interfaces (e.g., 260, 265, 270), among other examples. Some applications can include front-end, user-facing services and applications that further include user interfaces (e.g., 266) for presenting at least some of the outputs and results of a transaction to a user. Such user interfaces can further accept one or more inputs or request values provided by a user, among other examples. Applications, software systems, and software components can perform any variety of tasks or services and be implemented using potentially any suitable programming language, architecture, and format.

Figure 3:
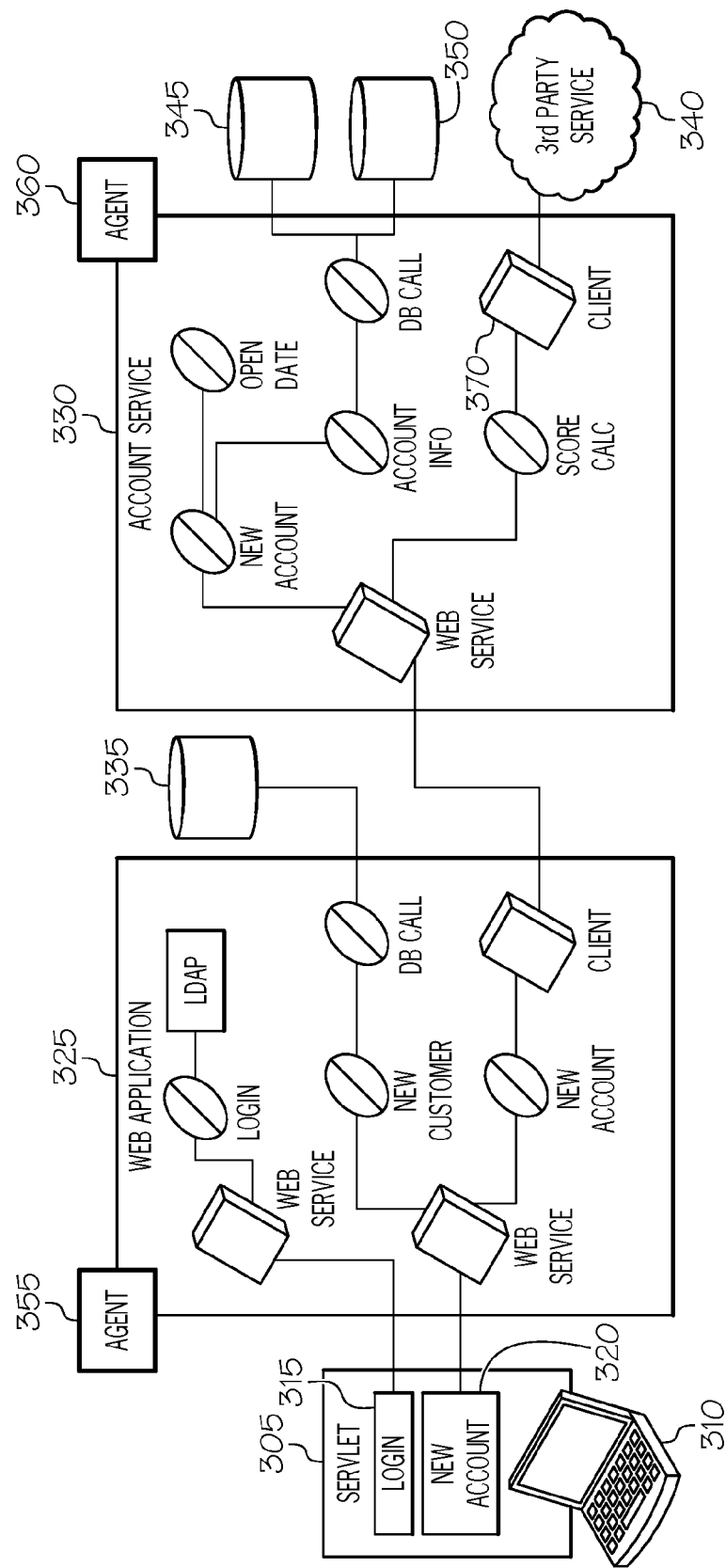
FIG. 3 is a simplified block diagram of an example system in accordance with at least one embodiment.

Turning to FIG. 3, a simplified block diagram is shown representing, for purposes of illustrating certain principles of this disclosure, an example software system and composite software components capable of engaging in one or more transactions. It should be appreciated that this particular system (and the transactions in this example) represents but a single example, and that a potentially unlimited variety of alternative systems, transactions, and architectures may make be monitored, analyzed, have defined transaction boundaries, and otherwise utilize the general features and principles outlined herein.

In the particular example of FIG. 3, a servlet component 305 is provided as a front end for an example Login transaction 315 and New Account transaction 320 accessible to users of user computer devices (e.g., 310). The Login transaction can involve calling a web service of a web application 325 and use of a Login software component (e.g., implemented in this particular example as JavaBean software components) and Lightweight Directory Access Protocol (LDAP) system to facilitate the logging-in of a user into an account of the web application 325. The web application 325 can potentially interact with multiple different users in multiple different concurrent session. Accordingly, the web application 325 can also maintain session identifiers, cookies, or other data to track sessions with the users. Other components of the system (e.g., backend service 330), however, may not maintain session or maintain different session data that abstracts the identity of the original requester (e.g., user), among other examples.

Figure 4A:
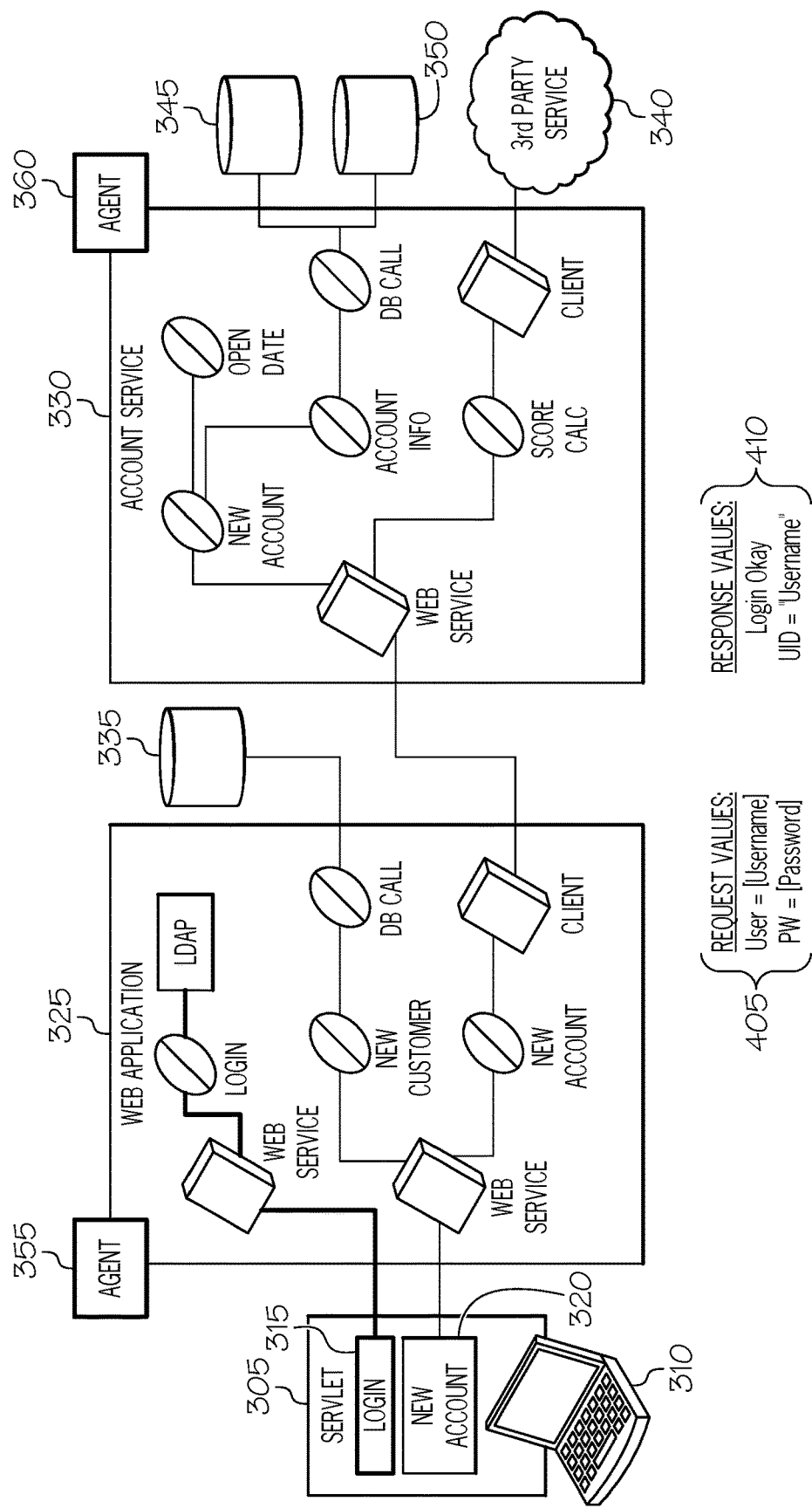
FIGS. 4A-4F are simplified block diagrams illustrating transaction flow paths involving the example system of FIG. 3 in accordance with at least one embodiment.

FIG. 4A illustrates the flow path of an example Login transaction 315 as well as example request values 405 of the Login transaction together with example response values 410 returned in the transaction in response to the request values 405. For instance, Login transaction can include a user-provided username and password pair (provided through servlet 305) resulting in a Login Okay response value when the provided username-password pair matches the username-password pair of an existing account managed by the LDAP system of web application 325. Further, the identity of the username can also be returned, for instance, in a welcome message identifying the username.

Figure 4B:
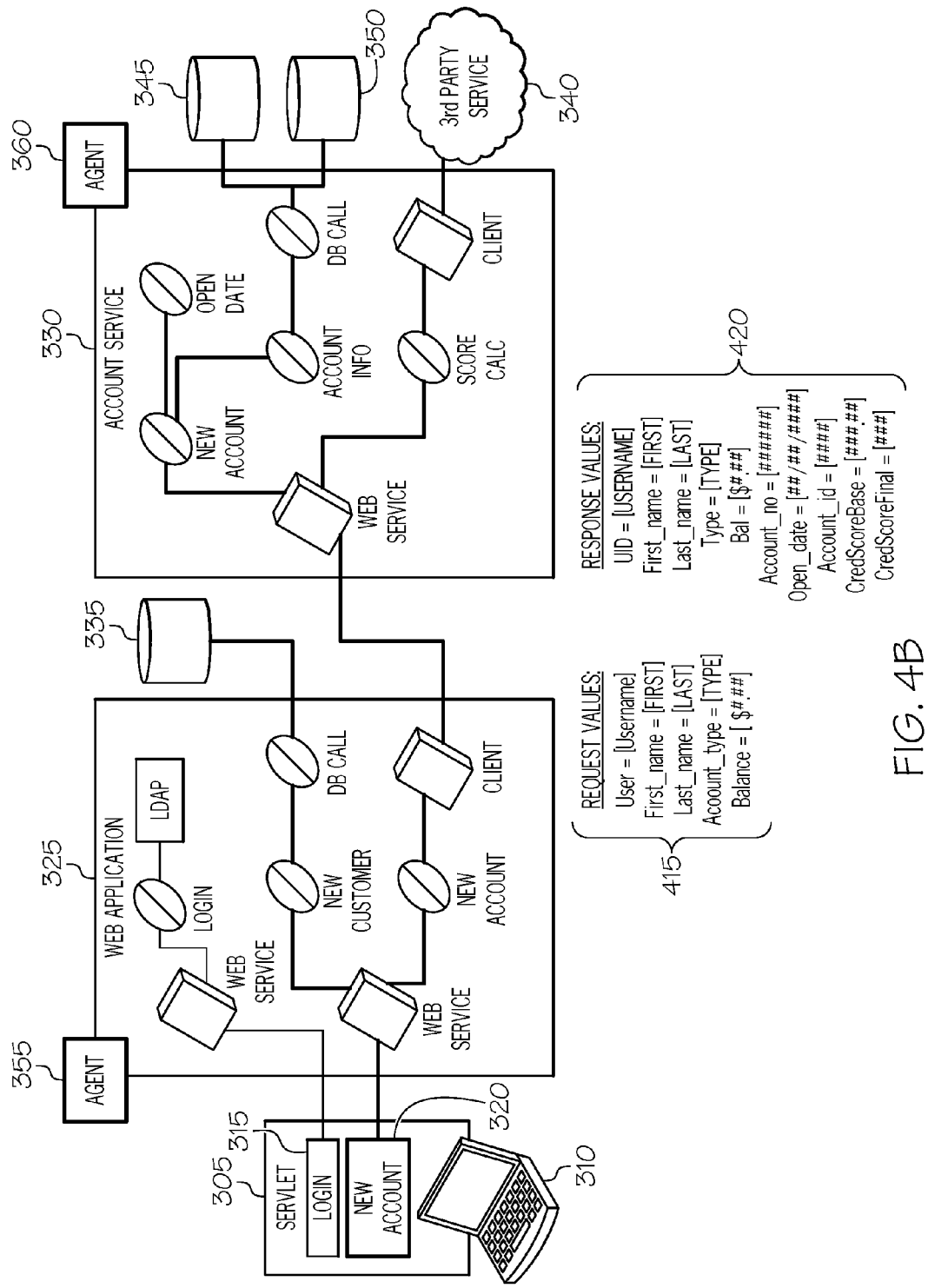

Returning to FIG. 3, additional transactions can be provided and identified. For instance, the New Account transaction 325 can support the creation and storage of a new account, such as an account for an ecommerce, banking, media subscription, or other application or service. For instance, as shown in the example of FIG. 4B, a more complex flow path can be identified for the New Account transaction 325 including multiple branches in the flow path. For example, upon creation of a new account (using New Account transaction 325) corresponding account information can be entered into a database 335 maintained outside of web application 325 and account service 330. The account information can be generated by one or more software components, such as by software components of account service 330, database 345, third party service 340, or other services and entities. New Account transaction can accept inputs or request values 415, such as username, first name, last name, account type, and account balance (e.g., for a loan, bank, e-payment, or other financial account). These request values 415, when processed in the transaction, can cause the retrieval, generation, and return of response values 420 including response values (such as values corresponding to user ID, first name, last name, account type, and balance) that are at least partially dependent or predictable based on values of the request values 415, as well as additional response values (such as values of an account number, account open date, account ID, credit score, etc.) that are not derived from or based on any of the request values 415. Such response values (e.g., account number, account open date, account ID, credit score) that are at least partially independent of request values 415 of the transaction can be considered dynamic values that are not easily derivable or predicted from the request values 415.

The flow paths of each respective transaction involving a particular software component or system can be represented in transaction path data generated, for instance, using a transaction path engine. Transaction path data can be generated by grouping and correlating transaction fragment information included in transaction data and/or agent data captured and generated by one or more agents 355, 360 deployed on the software components and/or systems involved in the transactions, as illustrated in the example of FIG. 3. Some software components, such as third party service 340, may be unmanaged in that they are not instrumented with agents under the control of or otherwise accessible to a transaction path engine, test engine, or other tool or entity monitoring the transaction. The involvement and functionality of such unmanaged software components may remain unknown to the tools utilized in the development of transaction paths and tests of a particular transaction, and can be effectively regarded as a black box within the transaction that accepts certain monitored requests and returns corresponding responses captured, in some instances, by the agent (e.g., 360) of a neighboring monitored software component (e.g., SOAP client 370) receiving the response value from the unmonitored component (e.g., third party service 340), among other examples.

Figure 4C:
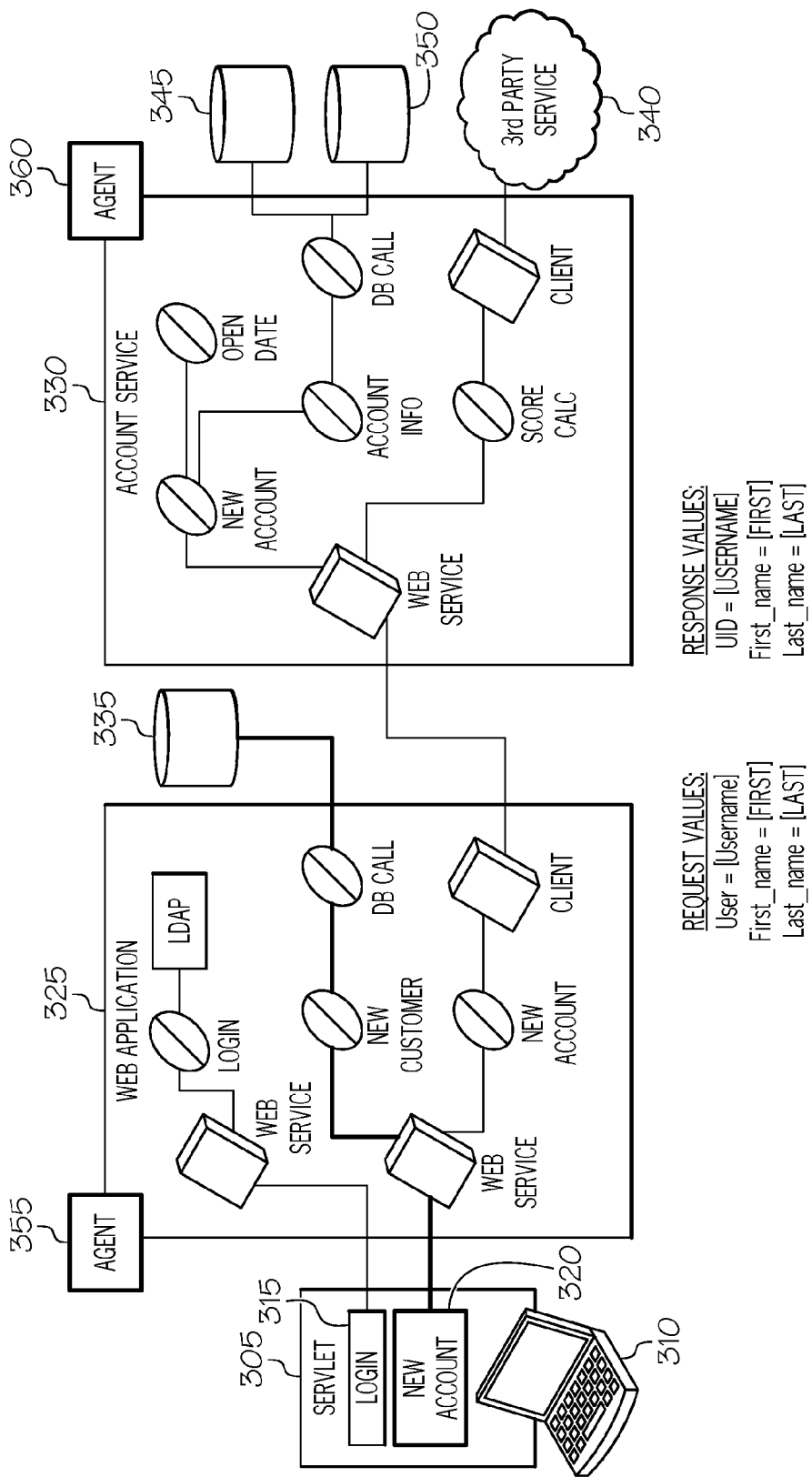

In some implementations, a single transaction can include the generation, communication, and use of multiple different response values. The generation and processing of various data within a transaction can involve the transmission of request values and response values to multiple different software components along multiple different sub-paths, or branches, of the transaction flow path. For example, FIG. 4C shows an example of a first branch of a transaction flow path shown bolded in FIG. 4B. The flow path branch of FIG. 4C shows a path for generating and storing a response value in database 335. For example, a response value can be generated or communicated by a New Customer software component for a new customer record utilizing other account information generated in the transaction. Response values such as UID, First_name, and Last_name may be provided from or generated by a New Customer software component or from a database call of database 335, among other examples. The actual values of UID, First_name, and Last_name, in some examples, can be obtained from request values provided by a user, such as the request values User, First_name, and Last_name. In some examples, proper operation of the New Customer software component may be evidenced by the generation of response values UID, First_name, and Last_name that echo request values User, First_name, and Last_name, among other examples.

Figure 4D:
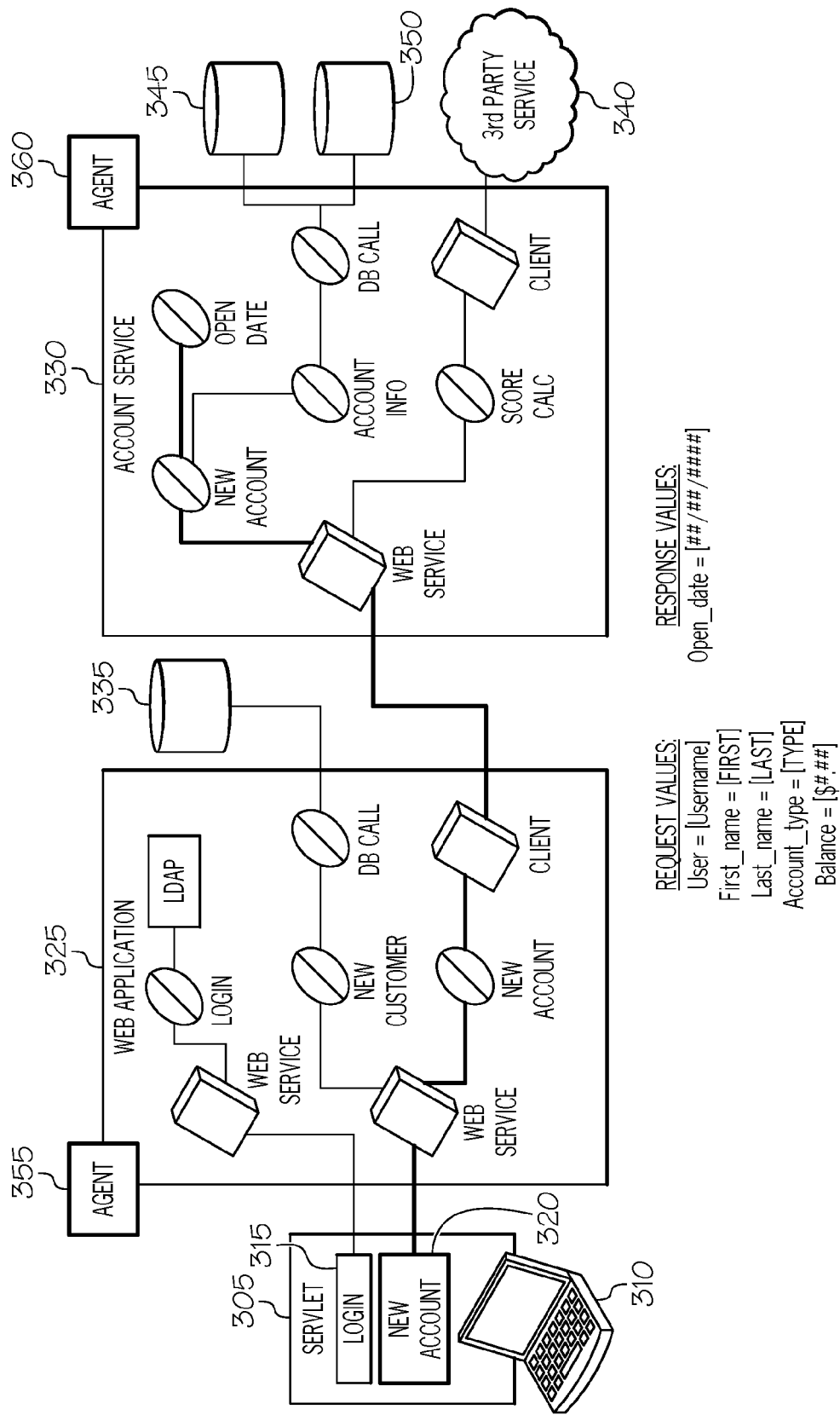

FIG. 4D illustrates another branch of an example New Account transaction, such as the New Account transaction introduced in the example of FIG. 4B. An account open date (e.g., Open_date) can be one of the response values returned in connection with the New Account transaction. In one example, an Open Date software component can include the logic for generating an account open date to be associated with a record to be provided to database 335 corresponding to the opening of the new account in connection with the New Account transaction. The account Open_date value can be generated by the Open Date component in response to a call from a New Account component of account service 330. The New Account component can additionally manage the generation of additional account data, such as by the Account Info component. The New Account component can be called through a web service call (such as a SOAP call) from web application 325 to account service 330 triggered by a New Account component at web application 325. Accordingly, as shown in the example of FIG. 4D, the invocation of an Open Date software component object can be triggered through a series of calls originating at servlet 305 and the response value Open_date can be generated and passed back from the Open Date component as a response over the same transaction flow path branch to be returned to servlet 305. The value of Open_date can be passed and reappear at each of the components upstream (i.e., in the direction of the flow path toward the software component originating the transaction request (e.g., servlet 305)). The Open Date software component can be identified as the source of the Open_date response value based on an identification of the Open Date component as a leaf in the transaction flow path branch corresponding to the Open_date response value. The Open Date software component can be identified as the leaf of the transaction flow path branch based on, for example, transaction data illustrating that the Open Date software component has no children components but is, instead, only a child component of other components with respect to the Open_date response value and the corresponding transaction path branch, among other examples.

Figure 4E:
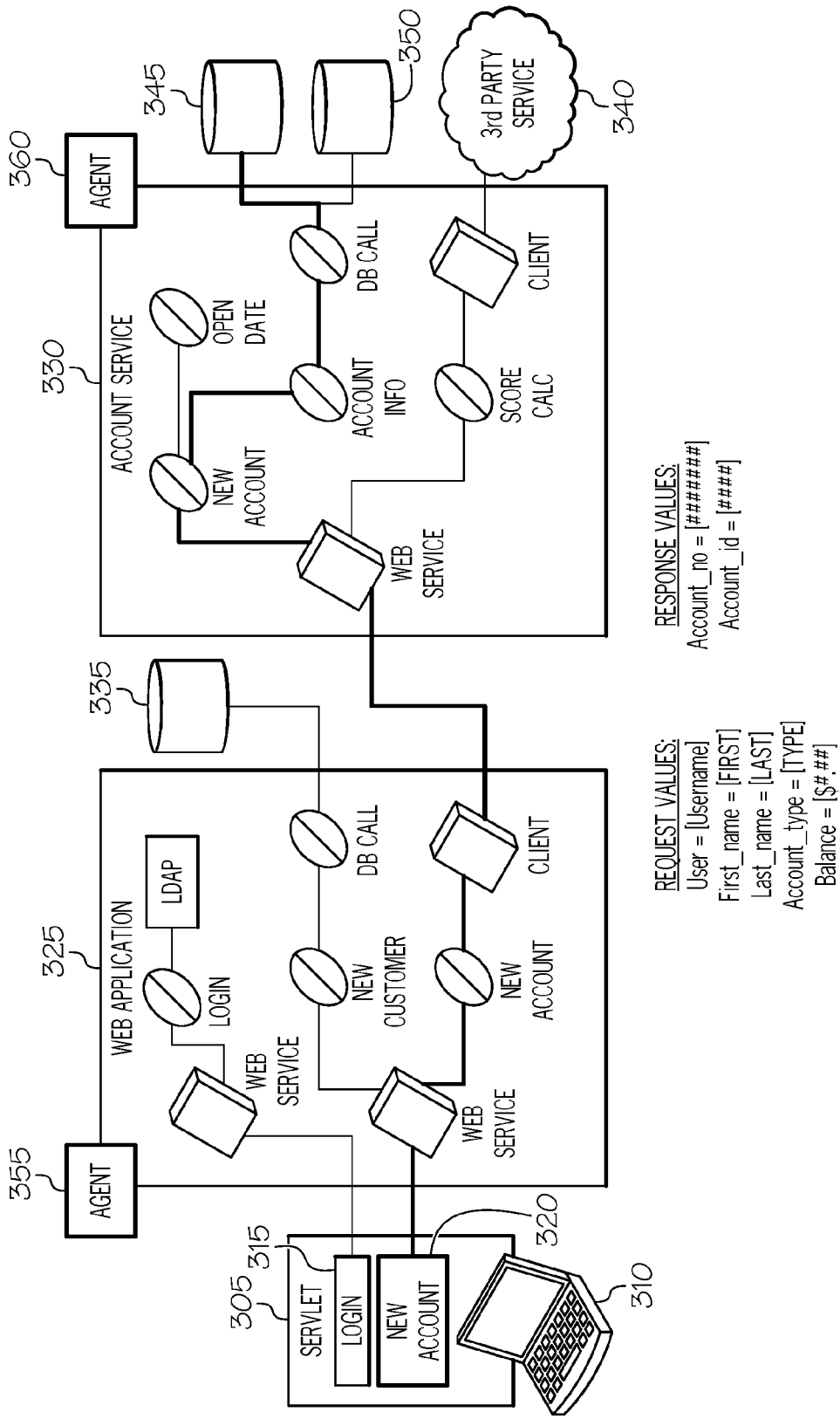

The example of FIG. 4E illustrates another example transaction flow path branch, in this case, relating to the chain of requests resulting in the generation of response values Account_no (e.g., providing the new account number generated for the account) and Account_id (e.g., corresponding to a database record for the new account), generated, for instance, by an unmonitored software component, such as database 345 or other data store, external to monitored software systems 325, 330, among other examples. The values of Account_no and Account_id, as with Open_date, may be independent of the request values provided in the transaction and involve calls by software components across application boundaries and networks connecting two disparate applications (e.g., 325, 330). For instance, the New Account software component of web application 325 may call the New Account software object of account service 330 using a web service call. An Account Info software component of account service 330 may in turn be called to generate values for the new account. For example, a database component 345 may include logic for auto-incrementing account number values (e.g., Account_no) for each new record that is added to the database 345. It can be identified that a database call was made to database 345 and that such a database call is a leaf of the transaction path branch. Further, it can be identified that the database 345 is the source of a particular value, such as in the example of FIG. 4E. Although the database 345 is not monitored by an agent, in some implementations, a transaction path engine or other tool can recognize certain types of calls to external components, such as SQL database calls, inverted list database calls, virtual storage access method (VSAM) calls, indexed sequential access method (ISAM) calls, flat file queries, and cache database calls, among other examples. Through such types of calls, the transaction path engine can make certain assumptions about the nature and operation of the external component. For instance, in the example of FIG. 4E, in instances of a SQL call to component 345, the SQL call can be identified, by an agent 350, and interpreted to conclude that component 345 is a database and the source of the value returned in response to the SQL call, among other examples. For instance, other types of calls can be used to implicitly identify the general character of a software component generating or returning a particular value in a transaction.

Figure 4F:
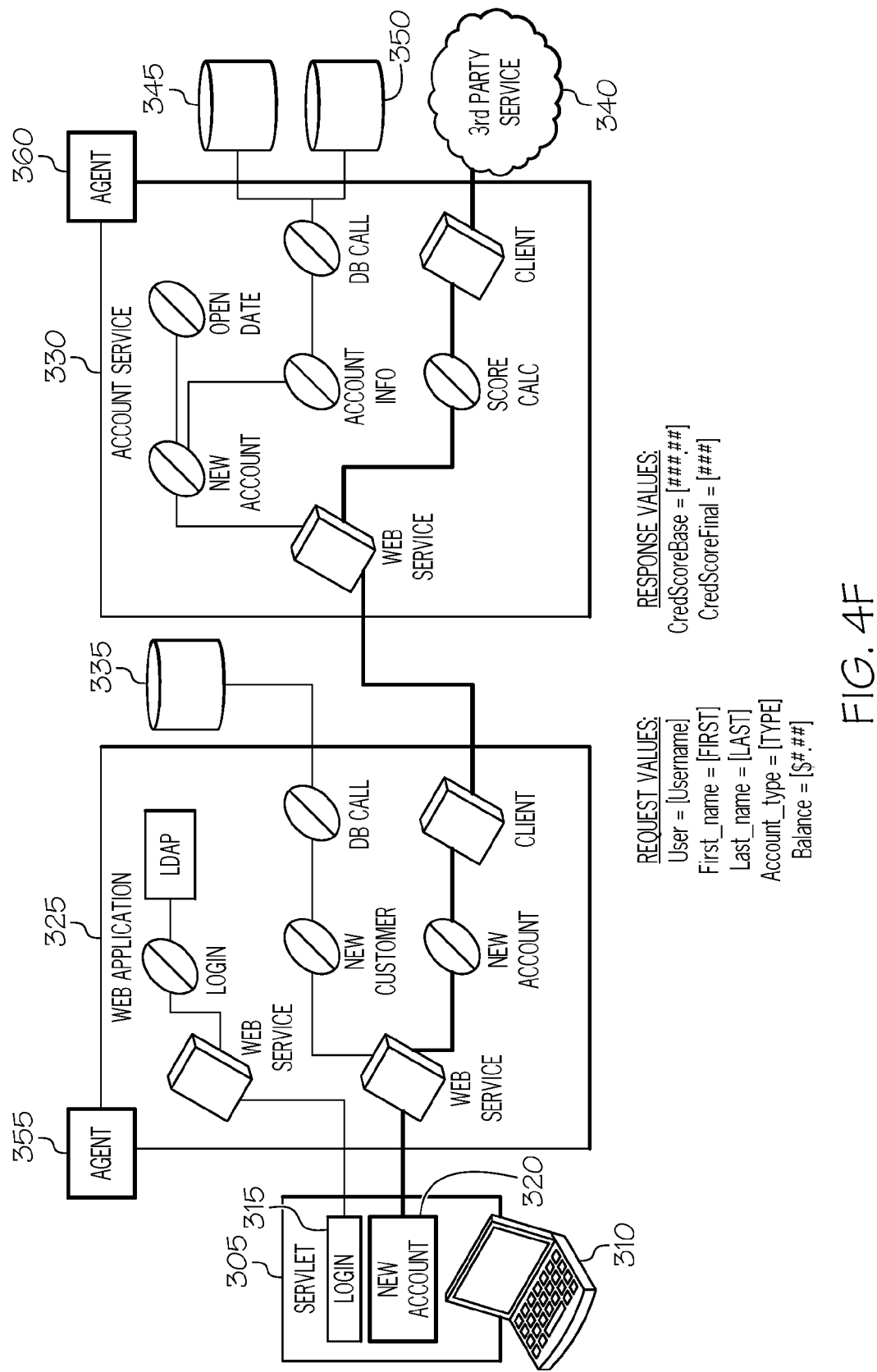

FIG. 4F illustrates another example transaction path branch involving a call to an unmonitored third party service 340. Transaction data collected or generated by agents 355, 360 can be processed to create transaction path data that can be analyzed to identify that a CredScoreBase value is returned from a third party service 340 and that the CredScoreBase value is utilized by a Score Calc software component to generate a CredScoreFinal value. Accordingly, an analysis of the corresponding transaction path data can result in the identification of the third party service 340 as the source of the CredScoreBase value and the Score Calc component of the account service 330 as the source of the CredScoreFinal value. As the third party service 340, in this example, is unmanaged, agents 355, 360 used to monitor the transaction are left without intelligence regarding how the CredScoreBase value is generated within the third party service 340, whether other external services are called in connection with the generation of the CredScoreBase value by the third party service 340, and so on. On the other hand, the agent 360 monitoring Score Calc component can identify with precision that the CredScoreFinal value was generated by the Score Calc component based on a CredScoreBase value returned from the unknown third party service 340. Further, agent 360 can capture the value returned by third party service 340 through monitoring of web service client 370, Score Calc component, etc.

In one example implementation, through transaction flow data (e.g., 245) generated by the transaction path engine 230, the nature of a particular response value and its dependency on one or more request values can be identified. For instance, transaction data can be correlated from consecutive transaction fragments and identify, for instance, from clock or timing data, or through a comparison of data included in requests and responses, that a particular response value corresponds to a particular request value. Additionally, characteristics detected at one component in a set of software components involved in a transaction flow (or a particular thread in the transaction flow) can be attributed to other components (and/or threads running on the components) based on determining that the components and/or threads are included in the same transaction flow. For instance, a session identifier detected by an agent (e.g., 355) during a session involving a request of web application 325 by a particular user can identify that the session pertains to the particular user. Using transaction data, downstream threads (e.g., from agents 355, 360), such as running on account service 330, can be determined to be within the same transaction or session causing these downstream threads to also be associated with the particular user (e.g., even when the downstream software component (e.g., 330)) is unaware of the particular user's involvement in the session. In the example of FIGS. 3-4F, the particular user may be a user different from the "user" identified in [Username], [FIRST], [LAST], etc. For instance, the user may correspond to a developer who performs an instance of the Login or New Account transactions in connection with testing or development of the software system illustrated in FIG. 3 (e.g., using test values for [Username], [FIRST], [LAST], etc., among other examples Linking together a set of distinct (and potentially disparate) transactions, transaction fragments, threads, software components, etc. on the basis of user session using agent-generated transaction data and determined transaction flows can be a powerful tool to support filtering development activities. For instance, development activities on a shared software system or component can be filtered on the basis of individual user-developers (or particular groups of user developers). For example, a developer-user can initiate a session in connection with a particular development activity. The user session may not explicitly identify the developer-user, but because the user session originates from the developer-user, the session can be identified as associated with the developer-user. In one example, at least one of the software components utilized in the session may be session-aware and an agent instrumented on this software component can identify that the transaction, or session, is a session to be associated with the particular developer-user. The agent and/or agent manager can tag transaction data describing transaction fragments in this session (as observed at this software component) with a token or other identifier to indicate that the transaction fragment is to be associated with the particular developer-user. For instance, an agent can possess logic to identify the type of session identifier (e.g., session token, cookie, etc.) used by the software components or application it is monitoring, allowing the agent to detect the presence of the cookie and tag corresponding transaction data (and even outbound requests) with a tag identifying the session, among other examples. Subsequent transactions in a session, as observed at this software component can be likewise identified. Further, through stitching (e.g., the determination that one transaction fragment is related to an immediately subsequent or previous transaction fragment in a transaction flow, can cause subsequent and/or previous transaction fragments to be likewise tagged as included in the user session and associated with the particular developer-user. This can be useful, for instance, when at least some portions of the software system are shared and potentially multiple different users (and user sessions) are ongoing during the particular developer-user's session and use of the shared software system.

Figure 5:
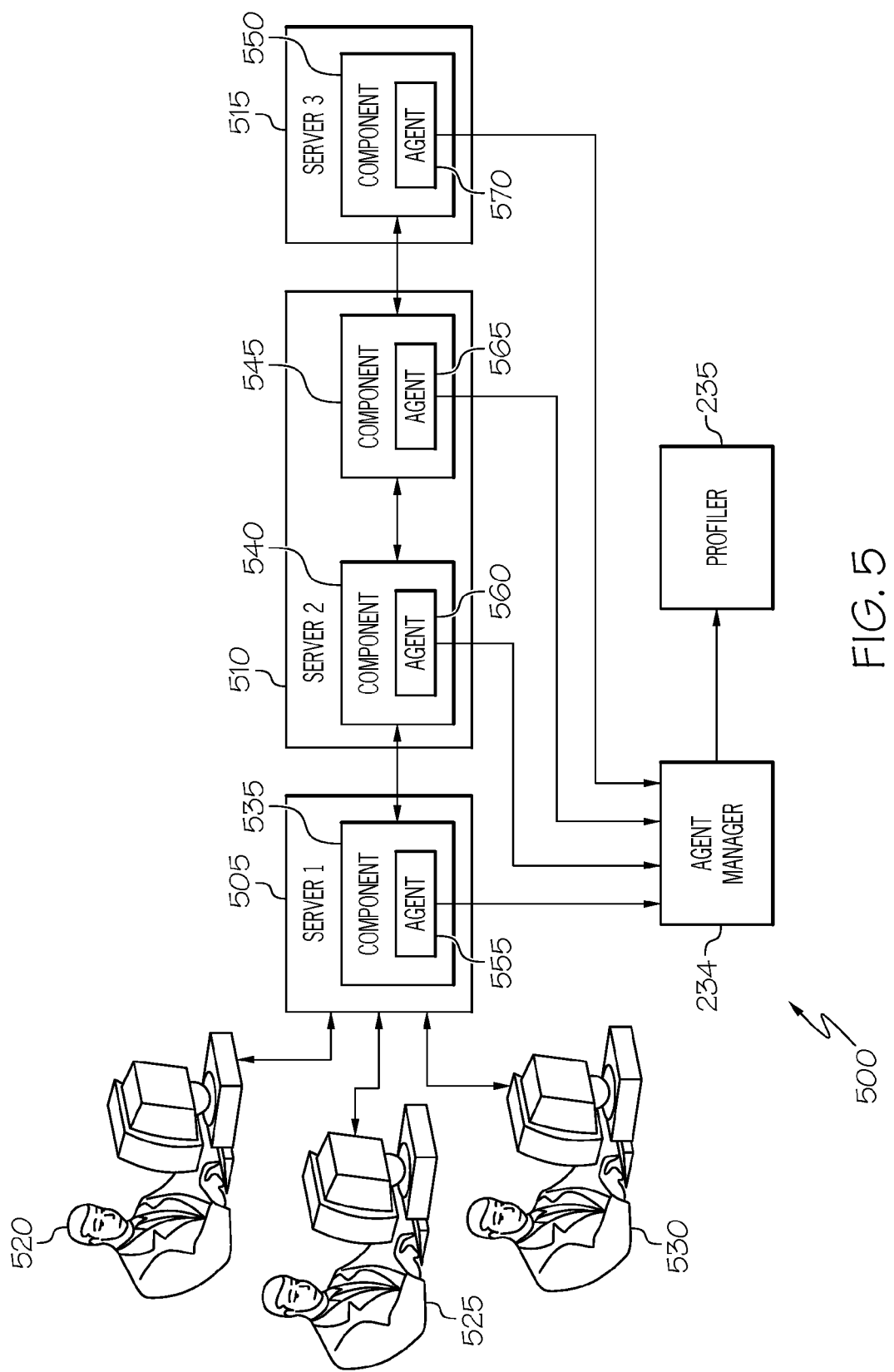
FIG. 5 is a simplified block diagram illustrating selective deployment of a profiler.

Turning to FIG. 5, a simplified block diagram is shown illustrating selective deployment of a profiler based on detecting that a subset of transactions during operation of a software component fall within a defined transaction boundary. In this example, the software system can be a multi-tier system including multiple server devices (e.g., 505, 510, 515) each hosting a portion of the composite software components (e.g., 535, 540, 545, 550) of the system. Agents (e.g., 555, 560, 565, 570) can be instrumented on each of the server devices (e.g., 505, 510, 515) and/or software components (e.g., 535, 540, 545, 550) to monitor operation of and transactions involving the software components (e.g., 535, 540, 545, 550). Multiple users (e.g., 520, 525, 530) may make use of the system. Such users can be multiple developer-users working together to perform development tasks on the system. In some cases, some of the users (e.g., 520, 525, 530) can be users interacting with a live production system. In either case, the users 520, 525, 530 can each be engaged in initiating and performing transactions on the system. In other instances, the transactions can be initiated by other systems or processes, such as a background process or test system, among other examples.

In the particular example of FIG. 5, each of the users 520, 525, 530 can each attempt, within a same window of time, to initiate transactions that utilize at least some of the same software components. For instance, two users (e.g., 520, 525) can initiate different types of transactions, but each type of transaction may utilize at least one of the same software components (e.g., 545) within the same window of time. Indeed, in some cases, the two transactions can involve two threads of the same software component (e.g., 545) that run at least partially concurrently. In some cases, the different transactions of the multiple users 520, 525, 530 may be different instances of the same transaction type and two or more threads at two or more of the software components (e.g., 535, 540, 545, 550) can at least partially overlap, among other examples.

Continuing with the above example, as the transactions take place, agents 555, 530, 565, 570 (e.g., similar to the agents discussed above) may monitor their respective software components and transactions (or transaction fragments) in which their software component participates and report transaction data to an agent manager 234 (or another component of a shared development platform). The transaction data may identify characteristics of the software components and/or threads involved in the transaction(s) as well as characteristics of messages (and their content) as sent during the transaction(s). Such characteristics can then serve as the basis of a transaction boundary used to trigger targeted development tasks, such as using a profiler (e.g., 236). For instance, a transaction boundary can be used to define the selective application of the profiler 236 such that only those transaction fragments falling within the transaction boundary (e.g., a transaction in which a particular characteristics is identified (i.e., from agent-generated transaction data)) are to be profiled, while other contemporaneous transactions (possibly involving the very same software components) run without being profiled, among other examples.

As illustrated in FIG. 5, transaction data can be sent to an agent manager (or another component of a shared development platform) capable of using the transaction data to determine relationships between parent and child transaction fragments and/or determine that distinct transactions belong to the same session. Determining such relationships between transactions can serve as the basis for determining commonality between the transaction data of related transactions across the multiple tiers (e.g., different servers and components) of the system. Accordingly, characteristics observable at one tier, software component, transaction, or transaction fragment in a transaction or session can be mapped to other components, transaction, or transaction fragments by association. This can allow portions of a transaction to be determined as falling within a transaction boundary (based on an identified characteristic) even when the characteristics was effectively invisible or unobservable at that portion of the transaction (e.g., a corresponding software component or transaction fragment downstream from the agent observing the characteristic).

Figure 6A:
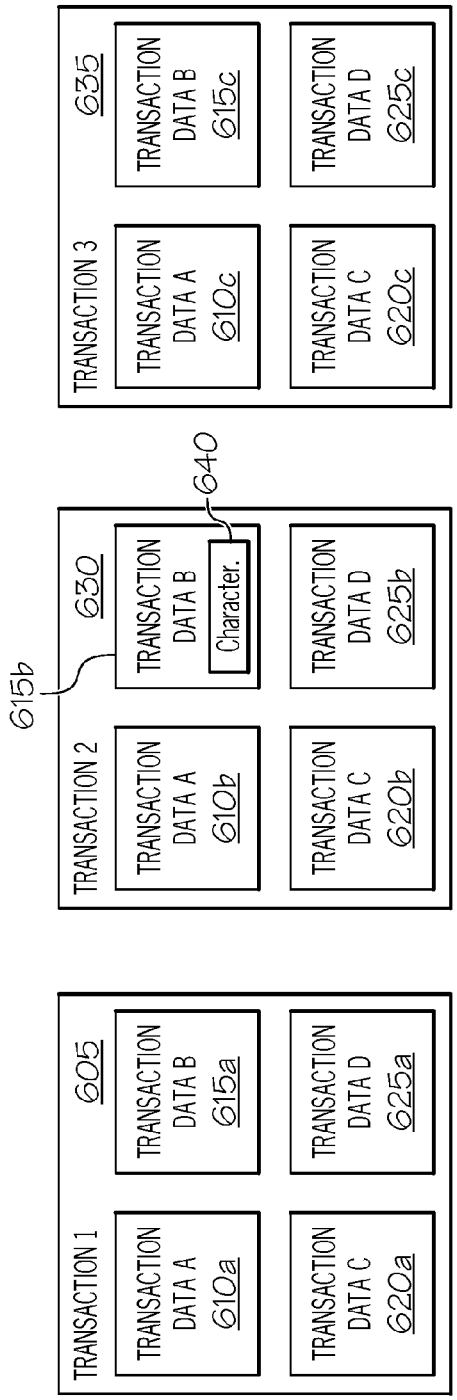
FIGS. 6A-6B are simplified block diagrams illustrating transaction data generated by example agents deployed on software component within a system.
Figure 6B:
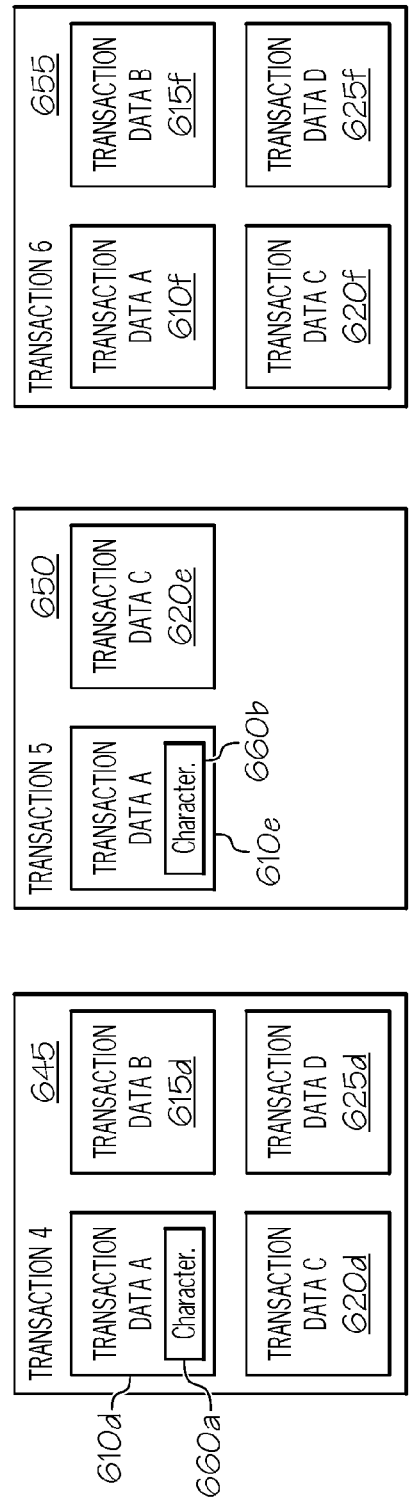

Turning to FIGS. 6A-6B, simplified block diagrams are shown representing agent-generated transaction data collected during different windows of time. In the example of FIG. 6A, transaction data has been collected from the agents (e.g., 555, 560, 565, 570) instrumented on software components (e.g., 535, 540, 545, 550) involved in three instances of a particular transaction (e.g., "Transaction 1," "Transaction 2", and "Transaction 3") supported by a software system. Accordingly, transaction data can be received by the agents (e.g., 555, 560, 565, 570) during the monitoring of each of these three instances and an agent manager (and/or transaction path engine) can identify relationships between individual transaction data frames (e.g., 610*a*, 615*a*, 620*a*, 625*a*) received from different agents (e.g., 555, 560, 565, 570) relating to different transaction fragments and determine (e.g., using the principles described herein) that the transaction fragments and corresponding transaction data should be grouped together (e.g., at 605). Likewise transaction data 610*b*, 615*b*, 620*b*, 625*b* and transaction data 610*c*, 615*c*, 620*c*, 625*c* can be determined to "belong" to their respective transaction instances (e.g., Transaction B and Transaction C respectively) and can be similarly grouped (e.g., at 630, 635). In the example of FIG. 6A, a particular transaction boundary can be defined to indicate that all transaction fragments in an instance of the transaction having a particular characteristic (e.g., 640) should be selectively profiled. For instance, the characteristic may indicate a value included in a particular message sent in a particular transaction fragment and the profiling may require that one or more of the forthcoming fragments in the transaction be profiled. In this example, the presence of characteristic 640 in a portion (e.g., 615*b*) of the transaction data reported by a particular agent during Transaction 2 can cause a determination (e.g., by boundary detection logic 232) that Transaction 2 falls within the transaction boundary causing at least a portion of Transaction 2 to be profiled, while other transactions (including contemporaneous transactions), such as Transaction 1 and Transaction 3, falling outside the transaction boundary run without being profiled.

Turning to FIG. 6B, additional examples of transaction data are illustrated, in this case for transactions "Transaction 4," "Transaction 5", and "Transaction 6". AS noted above, transaction data can also be used to group transactions (and their transaction data) according to session, such as a session initiated or involving a particular user or client system. For instance, a transaction boundary can be defined that causes all transactions falling within a session of a particular user (e.g., a particular one of a team of developer-users) to be considered as falling within a transaction boundary to filter the application of a particular development tool (e.g., a profiler) on the system. For instance, in the example of FIG. 6B, transaction data (e.g., 610d, 610e, 610f, 615d, 615f, 620d, 620e, 620f, 625d, 625f) is collected from instances of at least two different types of transactions. A characteristic 660a, 660b can be identified in transaction data 645, 650 of two different transactions, Transactions 4 and 5, that identifies that each transaction was included in particular user session (e.g., of the particular developer-user). Accordingly, Transactions 4 and 5 can be determined to fall within the corresponding transaction boundary and can be selectively profiled while Transaction 6 is not.

Figure 7:
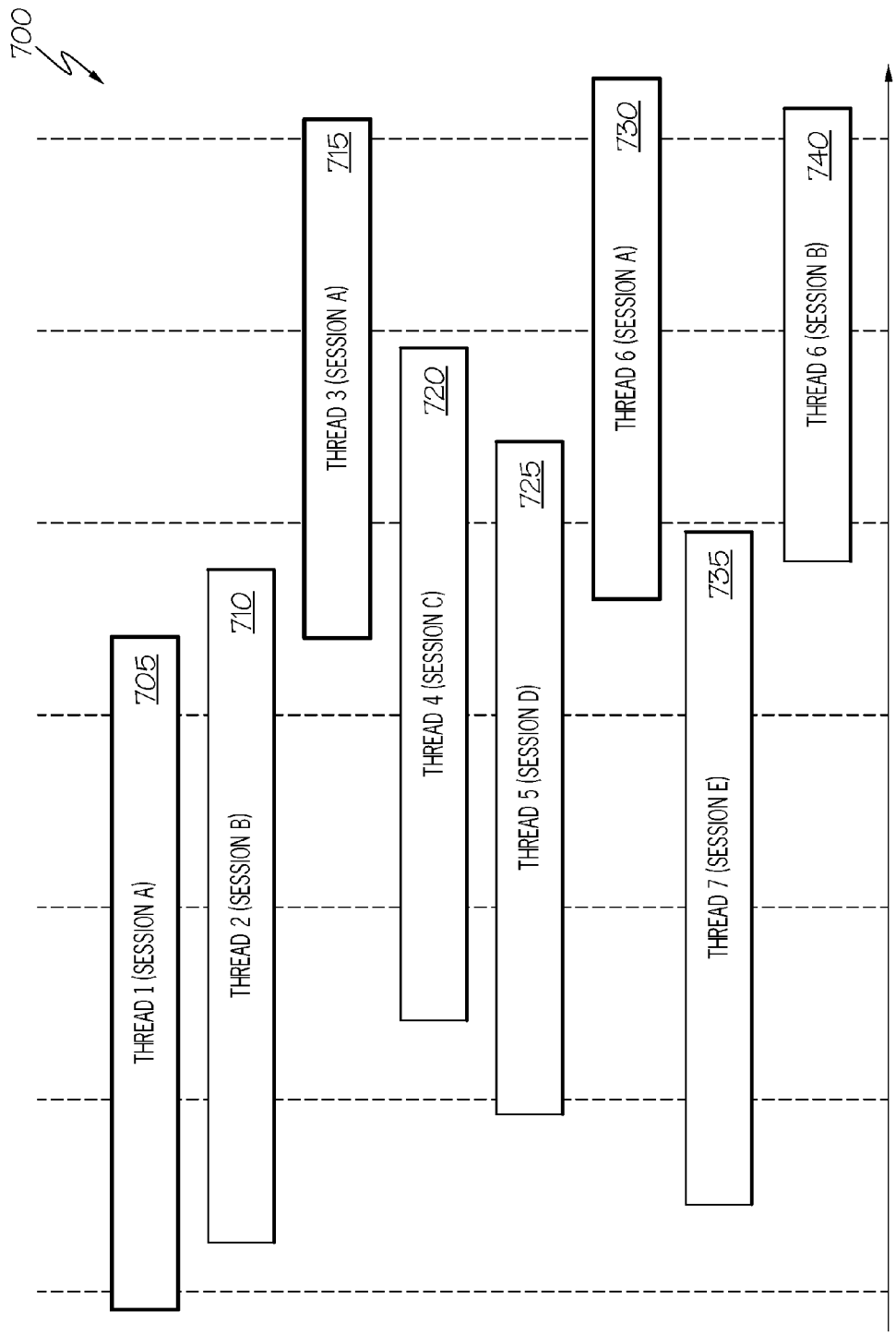
FIG. 7 is a simplified block diagram illustrating a collection of execution threads running in connection with operation of an example software system.

Turning now to FIG. 7, a simplified diagram 700 is shown illustrating a collection of execution threads running in connection with operation of a particular software system. At least some of the threads (e.g., 705, 710) run (at least partially) concurrently and involve the same software component code. In this example, agents can provide transaction data relating to transactions observed during the system's operation and can serve as the basis for determining that the threads relate to corresponding transactions in various user sessions involving the system. In this example, a transaction boundary can be defined such that the threads (of transactions) in a "Session A" are to be selectively profiled. Accordingly, a shared development platform can identify (from previously or contemporaneously generated transaction data) the sessions (and/or transactions) to which each thread corresponds. In this example, Thread 1 (705), Thread 3 (715), and Thread 6 (720) can be determined to run within an instance of Session A and cause these specific threads 705, 715, 720 to be profiled, while contemporaneous threads (e.g., 710, 720, 725, 735, 740) are not, even when some of the un-profiled threads (i.e., those falling outside the transaction boundary) involve the same code as profiled threads 705, 715, 720.

As shown in FIG. 7, correlating threads to transactions and session can allow certain development tasks (such as profiling) to be applied in a targeted fashion to only some threads. Indeed, in some cases, an example transaction boundary can be defined that causes only a portion of the threads within a particular transaction or session to be profiled. For instance, when completion of a parent thread cause two or more concurrent children threads to be launched and run, some transaction boundaries may cause only one of the child threads to be profiled, among a myriad of potential alternative examples.

Figure 8A:
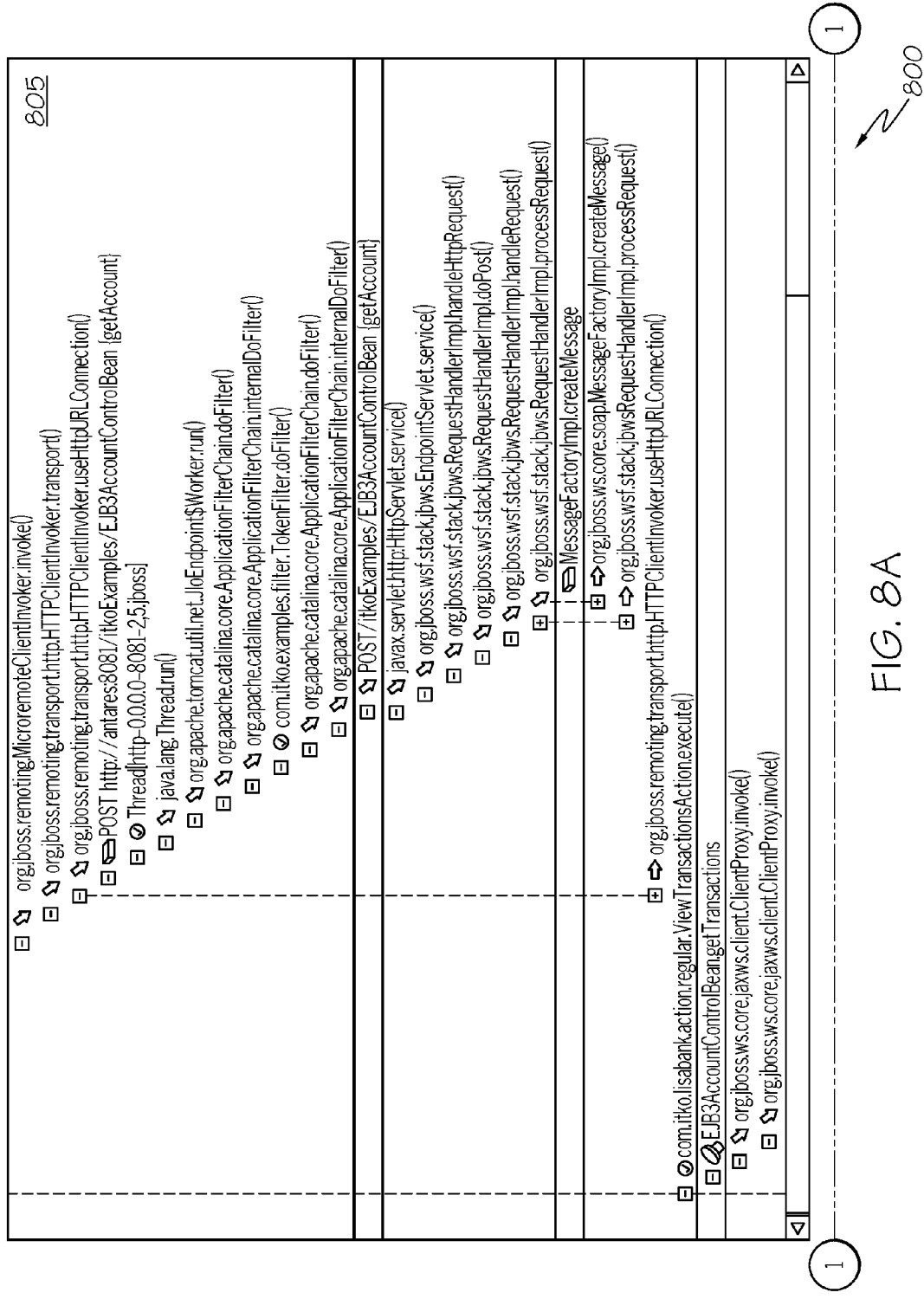
FIGS. 8A-8B illustrate a screenshot of an example graphical user interface (GUI)
Figure 8B:
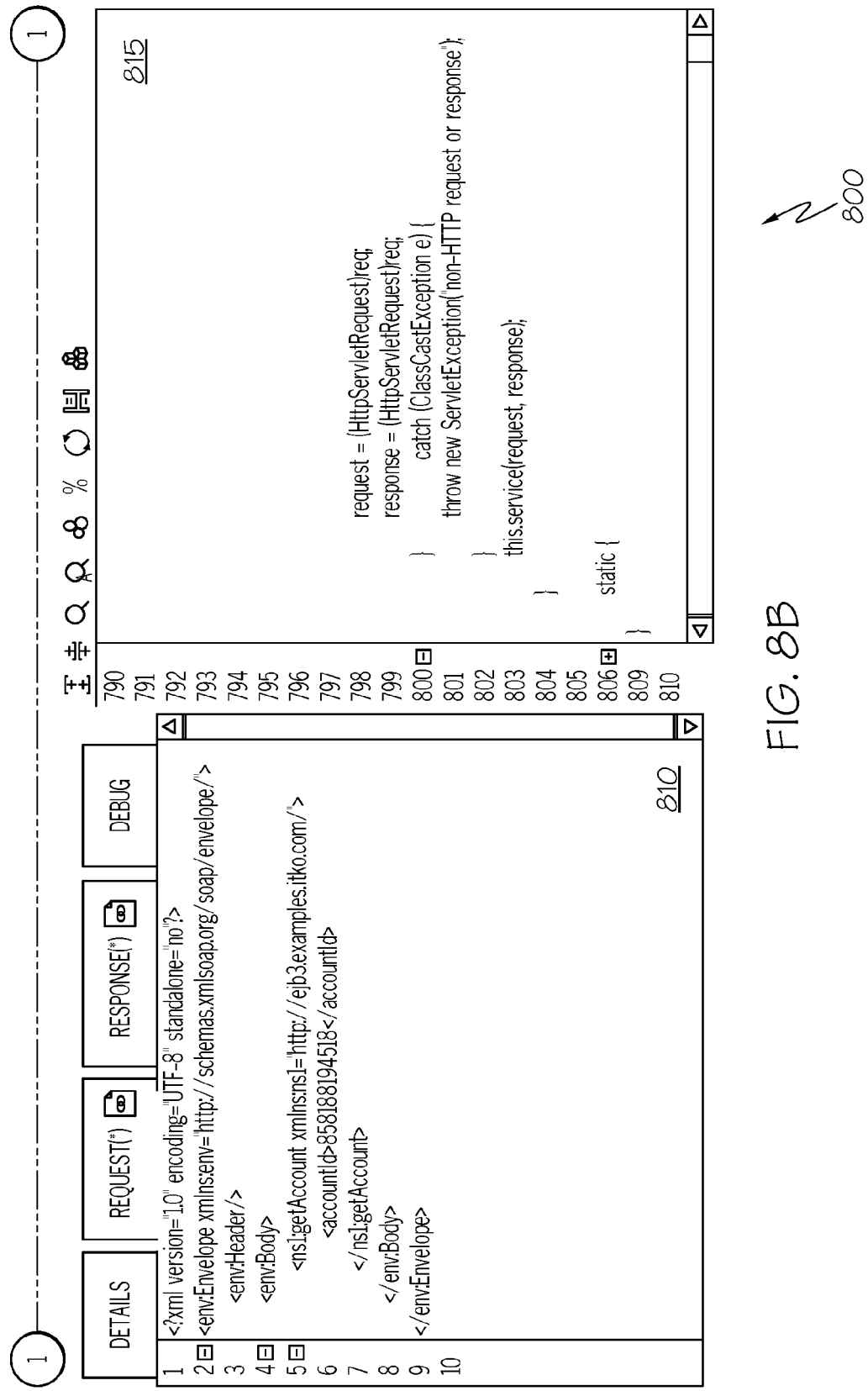

Turning to FIGS. 8A-8B, a screenshot 800 of an example graphical user interface (GUI) is shown for use in connection with the selective profiling of transactions using a shared development platform. The GUI can provide for the presentation of profiling results generated from the selective profiling of transactions (or threads) within a defined transaction boundary. As noted above, a transaction boundary can be defined to profile operation of a single (and, in some cases, multi-tier) software system at one of several levels of granularity. For instance, transaction boundaries can cause threads to be profiled within one or more sessions, transactions, or transaction fragments. In some cases, the resulting profiling can involve profiling a set of threads. The set of threads can potentially span multiple sessions (e.g., a particular user, for whom a transaction boundary is defined, performs multiple transactions in multiple user sessions (that the system identifies as all associated with the particular user)), multiple software components (and multiple servers), and multiple transactions. The definition of a transaction boundary can allow the profiling results derived from the profiling of threads with any such custom-defined transaction boundary to then be combined and presented to a user (e.g., in the GUI of FIGS. 8A-8B). Indeed, the graphical presentation of the profiling results can indicate how the profiling results are related (e.g., indicate "jumps" between threads, processes, or software components, indicate how the threads interact, etc.). Further, additional information, not captured during the profiling, but captured by agents during monitoring of the transactions, can be added to the presentation of the profiling results, to add additional context to the profiling results. Alternatively, a graphical representation of the transaction data and determined transaction flow can be generated and presented in the GUI, which can be supplemented with results of the corresponding selective profiling. In some examples, such presentations can incorporate features and functionality similar to that described, for instance, in U.S. patent application Ser. No. 11/328,509, titled "Graphical Model for Test Case Viewing, Editing, and Reporting," filed Jan. 9, 2006, which is hereby incorporated by reference in its entirety as if completely and fully set forth herein. Indeed, such presentations can be interactive, allowing users to select graphical representations of transaction fragments and corresponding software components involved in each transaction fragment to cause additional information concerning the selected transaction fragment and/or software component(s) to be displayed. In some cases, this additional information can incorporate that portion of the profiling results generated during related selective profiling of the system and corresponding to the portion of the transaction selected by the user using the GUI.

Continuing with the example of FIGS. 8A-8B, various windows (e.g., 805, 810, 815) can present varying views of the software system under development. For instance, a first window 805 can be used to present a collection of profiling results generated from profiling a portion of a software system according to a defined transaction boundary, such as described above. Transaction data, such as the content of requests and response exchanged in the various transaction fragments determined to fall within the same transaction boundary can also be presented with the displayed profiling results (e.g., request content displayed in window 810). Further, code corresponding to one of more of the software components invoked within the transaction boundary can also be made available for inspection, for instance, in window 815, among other information and examples. For instance, other information such as additional transaction data details, transaction fragment response content, debugging results, and other information corresponding to the profiling and/or corresponding transaction boundary can be made available for presentation to a user using a GUI of the shared development platform.

Figure 9:
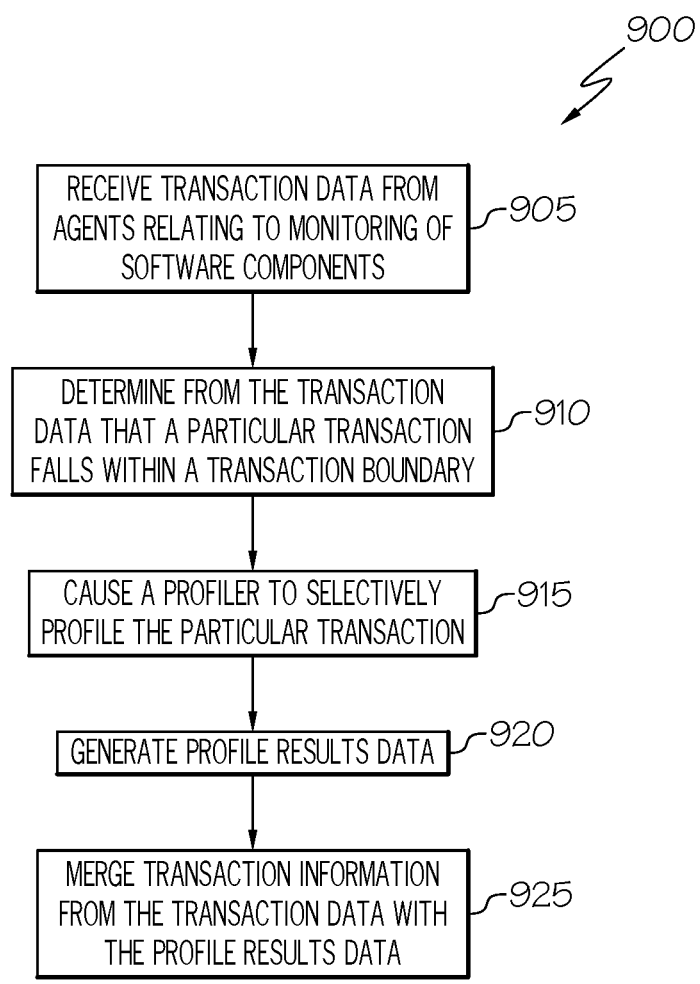
FIG. 9 is a simplified flowchart illustrating example techniques in connection with selective profiling of a software system in accordance with at least one embodiment.

FIG. 9 is a flowchart of an example technique for performing targeted profiling of a software system. For instance, transaction data can be received 905 from a variety of agents monitoring a plurality of software components in the system. The transaction data can identify characteristics of various fragments of a plurality of transactions observed by the agents. At least a particular one of the transactions can be determined 910 to fall within a defined transaction boundary. In some cases, the particular transaction can be one of several transactions (e.g., in one or more sessions) determined (from the transaction data) to fall within the transaction boundary. A profiler can be invoked, triggered, or otherwise caused 915 to selectively profile at least some of the threads running within the transaction fragments falling within the defined transaction boundary. Profiling completed by the profiler within the transaction boundary can result in the generation 920 of profile results data. Transaction information from transaction data generated by agents during the transaction fragments within the same transaction boundary can be identified and merged 925, or otherwise associated, with the profile results data. In some cases, profile results from distinct profiling sessions can be merged together into a single profile results set based on the distinct profiling sessions profiling transaction fragments within the same transaction boundary, among other example features.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
receiving transaction data from a software-based agent instrumented on a particular software component in a system comprising a plurality of software components, wherein the transaction data identifies characteristics of a particular transaction involving the particular software component and another software component in the plurality of software components as observed by the agent during operation of the system, and the particular transaction is contemporaneous with another transaction involving software components in the system;
using a data processing apparatus to determine, from the transaction data, that the particular transaction falls within a defined transaction boundary for the system, wherein transactions meeting a set of conditions fall within the transaction boundary, and the other transaction falls outside the transaction boundary; and
invoking a profiler to perform software profiling of a portion of a system during the particular transaction based on determining that the particular transaction falls within the transaction boundary, wherein the portion of the system comprises at least the particular software component, software profiling comprises capturing information about execution of threads in the particular transaction, and the other transaction is not profiled by the invoked profiler based on the transaction boundary.

2. The method of claim 1, further generating enhanced profile data for the particular transaction data, wherein the enhanced profile data combines at least a portion of the transaction data with profile results generated by the profiler from the software profiling of the particular transaction.

3. The method of claim 2, wherein the transaction data comprises first transaction data, the agent comprises a first agent, the profile results comprise first profile results, and the method further comprises:
receiving second transaction data generated by a different second agent, wherein the second transaction data identifies characteristics of a second transaction involving software components of the system, and the second transaction is observed by the second agent;
determining, from the second transaction data, that the second transaction also falls within the transaction boundary; and
causing a profiler to profile the second transaction based on determining that the second transaction falls within the transaction boundary a second agent, wherein profiling the second transaction generates second profile results.

4. The method of claim 3, wherein generating the profile data further comprises merging the second profile results with the first profile results based on both the particular transaction and second transaction falling within the transaction boundary.

5. The method of claim 2, wherein the transaction data identifies characteristics not included in the profile results.

6. The method of claim 5, wherein the characteristics not included in the profile results comprise content of a particular request in the transaction and content of a response to the request in the transaction.

7. The method of claim 5, further comprising identifying, from the transaction data, another transaction either upstream or downstream from the particular transaction.

8. The method of claim 7, wherein the transaction data comprises first transaction data and the method further comprises:
receiving second agent-generated transaction data describing characteristics of the other transaction;
determining involvement of a second one of the plurality of software components in the other transaction; and
determining a transaction flow comprising the particular transaction and the other transaction.

9. The method of claim 8, further comprising generating a graphical representation of the transaction flow.

10. The method of claim 9, wherein interaction with a portion of the graphical representation corresponding to the particular transaction causes a representation of the profile to presented.

11. The method of claim 1, wherein the characteristics comprise an indication of a session involving a particular user and the transaction boundary defines transactions within sessions involving the particular user.

12. The method of claim 11, wherein transaction boundary defines transactions within sessions of any one of a particular group of users comprising the particular user.

13. The method of claim 12, wherein the first software component receives a session identifier corresponding to the particular user and the second software component does not receive the session identifier.

14. The method of claim 12, wherein the particular user corresponds to a developer of the system.

15. The method of claim 1, wherein the characteristics comprise a particular value being included in an original request of the transaction.

16. The method of claim 1, wherein the characteristics comprise the transaction being invoked by a particular background process.

17. The method of claim 1, wherein the characteristics comprise size of a particular request in the transaction being in excess of a threshold.

18. The method of claim 1, wherein all transactions of the system during a period falling within the transaction boundary are caused to be profiled.

19. A non-transitory computer readable medium having program instructions stored therein, wherein the program instructions are executable by a computer system to perform operations comprising:
receiving transaction data from an agent instrumented on a particular software component in a system comprising a plurality of software components, wherein the transaction data identifies characteristics of a particular transaction involving the particular software component and another software component in the plurality of software components as observed by the agent during operation of the system, and the particular transaction is contemporaneous with another transaction involving software components in the system;
determining, from the data, that the particular transaction falls within a defined transaction boundary for the system, wherein the transaction boundary defines a subset of all transactions of the system, transactions meeting a set of conditions fall within the transaction boundary, and the other transaction falls outside the transaction boundary; and
causing a profiler to perform software profiling of a portion of a system during the particular transaction based on determining that the particular transaction falls within the transaction boundary, wherein the portion of the system comprises at least the particular software component, the software profiling comprises capturing information about execution of threads in the particular transaction, and the other transaction is not profiled by the profiler based on the transaction boundary.

20. A system comprising:
a data processor;
a memory;
a profiler; and
an agent manager to:
receive transaction data from an agent instrumented on a particular software component in a system comprising a plurality of software components, wherein the transaction data identifies characteristics of a particular transaction involving the particular software component and another software component in the plurality of software components as observed by the agent during operation of the system, and the particular transaction is contemporaneous with another transaction involving software components in the system;
determine, from the data, that the particular transaction falls within a defined transaction boundary for the system, wherein the transaction boundary defines a subset of all transactions of the system, transactions meeting a set of conditions fall within the transaction boundary, and the other transaction falls outside the transaction boundary; and
cause a profiler to perform software profiling of a portion of a system during the particular transaction based on determining that the particular transaction falls within the transaction boundary, wherein the portion of the system comprises at least the particular software component, the software profiling comprises capturing information about execution of threads in the particular transaction, and the other transaction is not profiled by the profiler based on the transaction boundary.

21. The system of claim 20, wherein a plurality of agents are instrumented on the plurality of software components.

22. The system of claim 20, wherein the system comprises a multi-tiered system comprising a plurality of server systems, the particular software component is hosted by a first one of the plurality of server systems, and another one of the plurality of software components is hosted by a second one of the plurality of server systems.

* * * * *